United States Patent [19]
Bose et al.

[11] Patent Number: 5,734,112
[45] Date of Patent: Mar. 31, 1998

[54] METHOD AND APPARATUS FOR MEASURING PRESSURE IN A CORIOLIS MASS FLOWMETER

[75] Inventors: Tamal Bose, Denver; Howard Vincent Derby, Boulder, both of Colo.; Andrew Keith Levien, Cranberry Township, Pa.; Anthony William Pankratz, Westminster, Colo.

[73] Assignee: Micro Motion, Inc., Boulder, Colo.

[21] Appl. No.: 689,839

[22] Filed: Aug. 14, 1996

[51] Int. Cl.$^6$ ..................................................... G01F 1/84
[52] U.S. Cl. ............................................................. 73/861.56
[58] Field of Search ........................ 73/861.355, 861.356, 73/861.357, 861.354

[56] References Cited

U.S. PATENT DOCUMENTS

| | | | |
|---|---|---|---|
| 4,823,613 | 4/1989 | Cage et al. | 73/861.38 |
| 4,934,196 | 6/1990 | Romano | 73/861.38 |
| 5,054,326 | 10/1991 | Mattar | 73/861.355 |
| 5,301,557 | 4/1994 | Cage et al. | 73/861.355 |
| 5,347,874 | 9/1994 | Kalotay et al. | 73/861.857 |
| 5,373,745 | 12/1994 | Cage | 73/861.37 |
| 5,423,225 | 6/1995 | Cage | 73/861.37 |
| 5,448,921 | 9/1995 | Cage et al. | 73/861.38 |
| 5,473,949 | 12/1995 | Cage et al. | 73/861.38 |
| 5,555,190 | 9/1996 | Derby et al. | 73/861.356 X |
| 5,576,500 | 11/1996 | Cage et al. | 73/861.357 |

FOREIGN PATENT DOCUMENTS

| | | | |
|---|---|---|---|
| WO 92/14123 | 8/1992 | European Pat. Off. | |
| 63-191024 | 8/1988 | Japan | 73/861.357 |

*Primary Examiner*—George M. Dombroske
*Assistant Examiner*—Paul D. Amrozowicz
*Attorney, Agent, or Firm*—Duft, Graziano & Forest, P.C.

[57] ABSTRACT

A method for determining pressure in an operating Coriolis effect mass flowmeter. The Coriolis flowmeter flow tubes are vibrated in both a bending mode (as is normal for measuring mass flow rate) and in a twisting mode. The ratio of the fundamental frequencies at which the flow tubes vibrate in each of the two vibration modes is proportional to the pressure within the flow tubes. In the preferred embodiment, a sum/difference method initially isolates the superposed sinusoids representing the fundamental frequencies of the two vibrational modes. Fast conjugate gradient (FCG) digital filters are then used to rapidly estimate the fundamental frequencies in each of the two vibration modes. The estimated frequencies are then used by filter chains including digital notch and band pass filters as well as recursive maximum likelihood (RML) digital filter techniques to enhance the bending mode and twisting mode fundamental frequency estimates. The enhanced bending mode and twisting mode frequency estimates are used to determine the pressure within the flow tubes as a function of the ratio of the two frequencies as well as to center the notch and band pass filter chains used to enhance the bending mode frequency of the two vibration sensor channels for mass flow rate computations. The pressure so determined may then be used to correct mass flow rate computations or for other pressure measurement purposes per se.

27 Claims, 11 Drawing Sheets

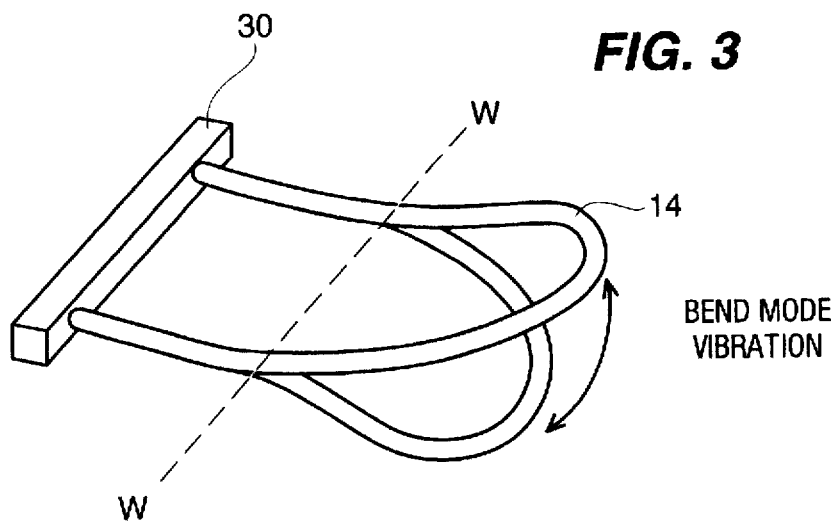
FIG. 3 BEND MODE VIBRATION
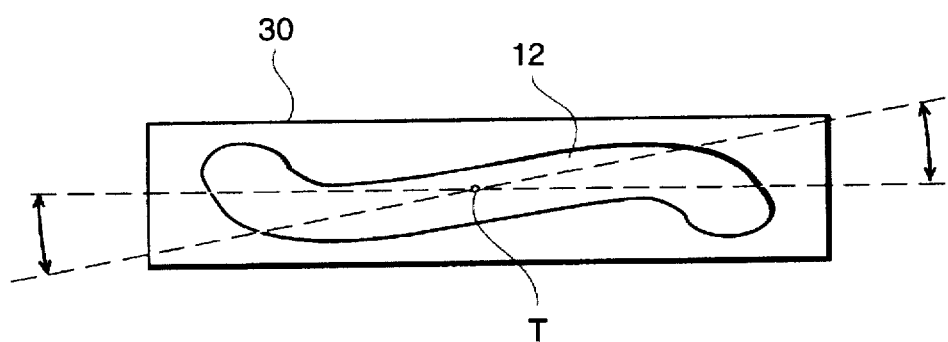
FIG. 4 TWIST MODE VIBRATION

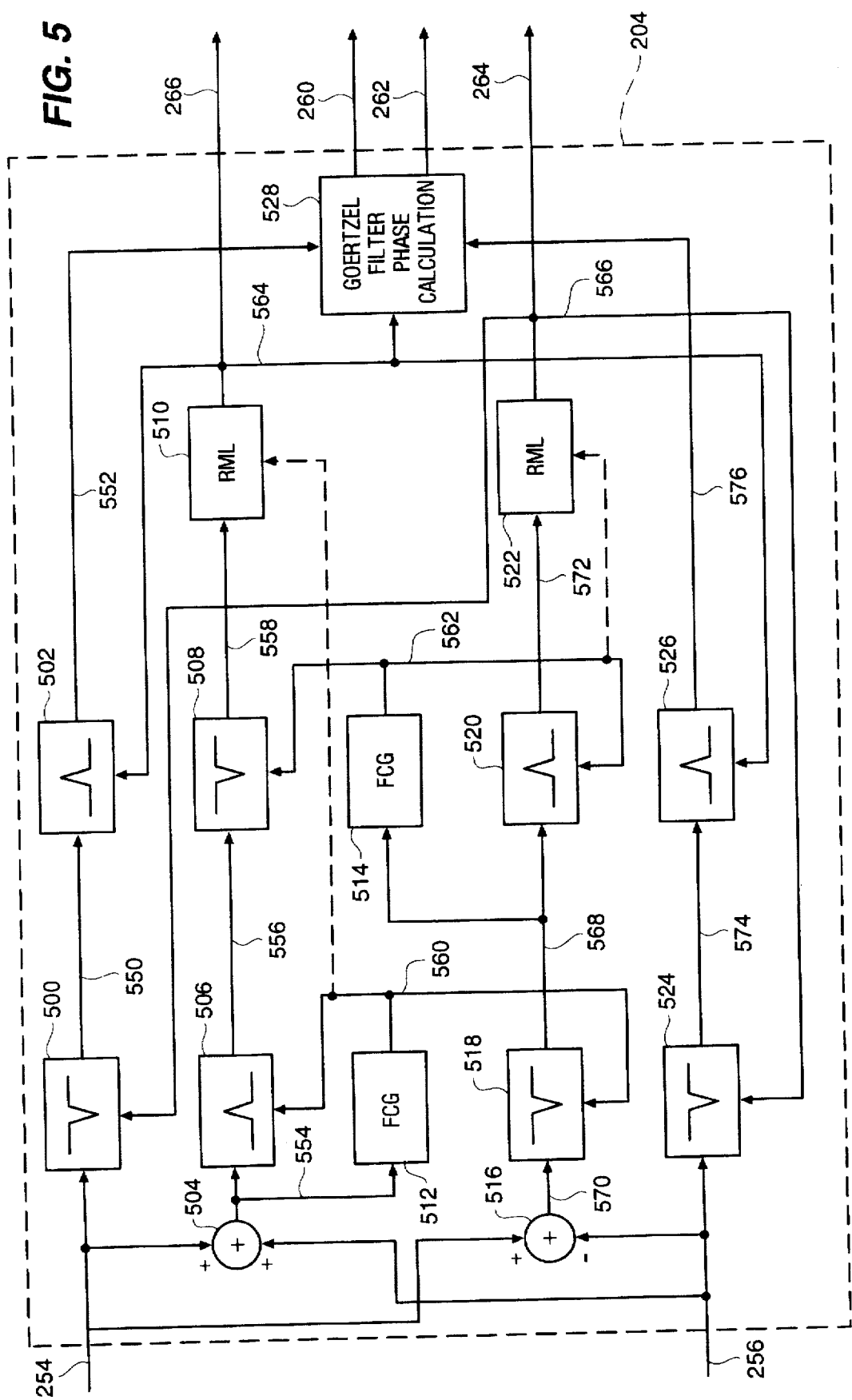

METHOD AND APPARATUS FOR MEASURING PRESSURE IN A CORIOLIS MASS FLOWMETER

FIELD OF THE INVENTION

The present invention relates to pressure measurement in association with Coriolis effect mass flowmeters and in particular to a method and apparatus for deriving material pressure information in response to the operation of the Coriolis effect mass flowmeter and for deriving precision mass flow information in response to the operation of the flowmeter.

PROBLEM

It is known to use Coriolis effect mass flowmeters to measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected conduit on the inlet side of the flowmeter, is directed through the flow tube or tubes, and exits the flowmeter through the outlet side. The natural vibration modes of the vibrating material filled system are defined in part by the combined mass of the flow tubes and the material flowing within the flow tubes.

When there is no flow through the flowmeter, all points along the flow tube oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

A complicating factor in this measurement is that the density of typical process materials vary. Changes in density cause the frequencies of the natural modes to vary. Since the flowmeter's drive control system maintains the flow tubes vibrating in resonance, the oscillation frequency varies in response to changes in density. Mass flow rate in this situation is proportional to the ratio of phase difference and oscillation frequency.

The above-mentioned U.S. Pat. No. Re. 31,450 to Smith discloses a Coriolis flowmeter that avoids the need for measuring both phase difference and oscillation frequency when measuring mass flow rate. Phase difference is determined by measuring the time delay between level crossings of the two sinusoidal signals of the flowmeter. When this method is used, the variations in the oscillation frequency cancel, and mass flow rate is proportional to the measured time delay. This measurement method is hereinafter referred to as a time delay or Δt measurement.

Information regarding the characteristics of material flowing in a Coriolis mass flowmeter is typically derived by instrumentation which measures the phase or time delay between two output signals of the sensors of the flowmeter. These measurements must be made with great accuracy since it is often a requirement that the derived flow rate information have an accuracy of at least 0.15% of reading. These flowmeter output signals are sinusoidal and are displaced in time or phase by an amount determined by the Coriolis forces generated by the meter through which the material flows. The signal processing circuitry which receives these sensor output signals measures this phase difference with precision and generates the desired characteristics of the flowing process material to the required accuracy of at least 0.15% of reading.

U.S. Pat. No. 5,473,949 of Dec. 12, 1995 to Cage et al., describes a method of determining pressure and density in a Coriolis mass flowmeter. The Cage patent teaches the excitation of a vibrating conduit in two different modes. Fluid is caused to flow in the conduit and measurements are made of the two modes of vibration at a "working point" of the flowmeter. The pressure and density of the material flowing in the flowmeter is then determined through the simultaneous solution of two equations as provided by the Cage patent.

Digital signal processing (DSP) techniques improve the accuracy of processing the signals from the Coriolis flowmeter sensors. DSP techniques and apparatus measure the phase difference between the sensor signals without introducing phase shifts between the two signals through the measurement process. Any phase shift (delay) induced by the DSP operation is identical for the two sensor signals. In addition, DSP techniques can more effectively filter the signals to extract the data from the ambient noise signals induced on the signals by the environment in which the flowmeter is operated.

It is known that changes in pressure within the flow tubes of the flowmeter can affect the accuracy of the mass flow measurements. Changes in the pressure of the material flowing within the flow tubes can change the stiffness of the flowmeter's flow tubes. This changes the resonant frequency of the flow tubes and causes errors in the mass flow measurement. To minimize the effects of pressure changes on resonant frequency and mass flow measurements, it is common to stiffen the walls of the flow tubes. However, increasing the stiffness of the flow tubes to decrease the effects of pressure changes may increase costs of the flowmeter and also decreases the sensitivity of the flowmeter. Decreased sensitivity due to pressure effects may limit the usable range for application of the flowmeter.

It is known in the art to use a pressure meter in conjunction with the flowmeter to measure the instantaneous material pressure and to use the measured pressure values in the correction of the mass flow rate measurements. However, the addition of an independent pressure meter adds complexity (and associated costs) to the flow measurement apparatus.

SOLUTION

The present invention solves the above and other problems, thereby advancing the useful arts, by providing methods and apparatus for measuring the pressure within a Coriolis mass flowmeter without the addition of an independent pressure meter. A pressure measurement derived from the operation of a Coriolis effect mass flowmeter is used to correct the mass flow measurements of the flowmeter. The pressure measurement may be utilized directly in the controlled process for other purposes requiring pressure measurements in a conduit. The methods and apparatus of the present invention operate the Coriolis effect mass flowmeter by vibrating the flow tubes in both a bending mode and in a twisting mode. Each mode of vibration has a fundamental frequency associated therewith. Well known signal processing techniques are used in conjunction with sensors positioned on the flow tubes to derive the mass flow rate as a function of the vibrations of the flow tubes. The methods of the present invention also make use of the fact that the ratio between a first vibration mode frequency of the flow tubes (e.g. the twisting mode frequency) and a second vibration mode of the flow tubes (e.g., the bending mode frequency) varies as a function of the pressure within the flow tubes. The ratio of the two measured frequencies is used by signal processing methods and apparatus of the present invention to determine the material pressure within the flow tubes. The same signal processing apparatus is used both to derive the mass flow rate and to determine the pressure within the flowmeter flow tubes. This obviates the need for separate pressure measurement apparatus in many material flow measurement applications. Numerous other correction factors, including flow tube temperature and material density, are measured by the signal processing apparatus and used to correct both the mass flow rate determination and the pressure determination. By determining pressure within the flow tubes, the mass flow rate measurements may be corrected to account for the affects of pressure on the mass flow rate measurements.

Measuring pressure within the flow tubes and compensating the measured mass flow rate to correct for the effects of pressure changes on the flow tubes vibration characteristics permits the flow tube walls to be constructed of thinner material. The flow tubes need be only thick enough to reasonably contain the static material pressure within the operating flow tubes. The flow tube walls need not be thickened for the sole purpose of reducing the effects of pressure changes on mass flow rate measurements. This thinner construction permits the flowmeter to maximize its sensitivity in flow measurement applications. The thinner flow tube walls provide better sensitivity for mass flow measurements. In particular, the thinner wall construction permits the flowmeter to measure lower mass flow rates such as is common in the measurement of mass flow of low density materials.

In accordance with the present invention, the ratio of any two vibrational mode frequencies may be used to determine the pressure if the two vibrational mode frequencies match certain characteristics. The two vibration modes must respond differently to changes in pressure within the flow tubes. Any two vibration mode frequencies which meet this criterion may be used to determine pressure within the flow tubes from the ratio of the two vibration mode frequencies. Although the description which follows presents the methods of the present invention in view of a particular two vibrational modes (the first bending mode and the first twisting mode) other vibrational modes may satisfy this same criterion and may serve equally well for determining the pressure within the flowmeter. Also in accordance with the present invention, pressure is derived by measuring the frequency of a single mode of vibration. This can be done when one of the modes is either not subject to or not affected by changes in the mounting conditions, the temperature of the flow tubes and the density of the material.

The present invention drives the flow tubes to vibrate both in the first out of phase bending mode (herein the bend mode or bending mode) and in the first out of phase twist mode (herein the twist mode or twisting mode). Depending on the needs of a particular flowmeter application, the flow tubes may be driven to vibrate in both modes simultaneously or, in the alternative, the tubes may be sequentially and repetitively driven in the twisting mode followed by the bending mode. In addition, the tubes may be vibrated continuously in the bending mode for normal mass flow measurements and periodically simultaneously vibrated in the twisting mode in order to periodically determine pressure and mass flow corrections therefrom.

Signal processing apparatus samples the output signals of sensors attached to the vibrating flow tubes to isolate and measure the frequency of each vibration mode. The signal processing apparatus determines the mass flow rate from the bending mode vibration signal samples as is well known in the art. The ratio of bending mode frequency and twisting mode frequency varies, in part, as a function of the material pressure within the mass flowmeter's flow tubes. The signal processing apparatus computes and utilizes this ratio to determine the pressure within the flowmeter. A mass flow rate correction factor is then determined using the pressure measurement. This correction factor is used by the signal processing apparatus to correct the mass flow rate. This corrected mass flow rate measurement is then used to control or otherwise report information regarding the process flow.

In addition to correction of the mass flow rate measurements, the pressure measurement of the present invention may be utilized per se to obviate the need for independent pressure metering devices. The present invention fulfills the need for a pressure measurement device in applications of Coriolis flowmeters where pressure measurements are also required.

BRIEF DESCRIPTION OF THE DRAWINGS

FIG. 3 is a perspective view of a typical flow tube in the bending vibrational mode;

FIG. 4 is a top view of a typical flow tube in the twisting vibrational mode;

FIG. 5 is a block diagram depicting the various digital filters applied to isolate and enhance signals processed by the programs in the DSP within mass flow instrumentation of FIG. 1 using the preferred embodiment sum/difference method of the present invention;

DETAILED DESCRIPTION OF THE INVENTION

Overview—Coriolis Flowmeter Applications

Figure 1:
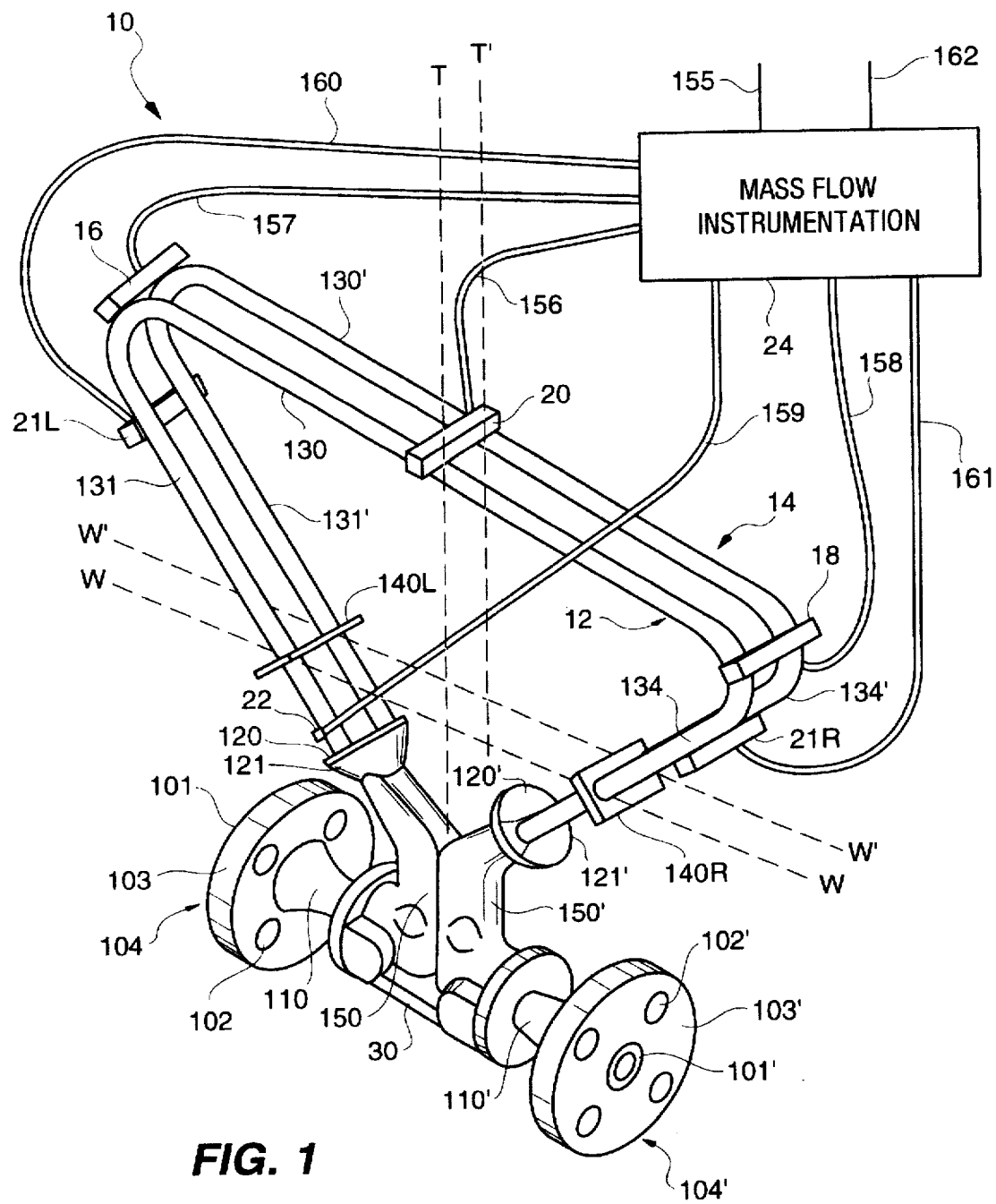
FIG. 1 depicts a typical mass flowmeter attached to mass flow instrumentation in which the methods of the present invention may be advantageously applied.

A typical Coriolis mass flowmeter 10 is illustrated in FIG. 1 as having two flow tubes 12, 14 affixed to a manifold body 30 so as to have substantially identical spring constants and moments of inertia about their respective out-of-phase bending axes W—W and W'—W'. One of ordinary skill in the art will readily recognize that the cantilever mounted flowmeter design depicted in FIG. 1 is intended only as exemplary of a Coriolis effect mass flowmeter in which the methods of the present invention may be advantageously applied. The methods of the present invention are advantageously applicable to flowmeters having many different flow tube geometries as well as flowmeters having multiple flow tubes or a single flow tube.

A drive coil and magnet 20 are mounted at a midpoint region between the top portion 130 and 130' of flow tubes 12, 14 to oscillate flow tubes 12, 14 out of phase about axes W—W and W'—W'. This vibration is referred to herein as a "bending" vibrational mode or simply "bend mode." FIG. 3 is a perspective view of a single flow tube 14 attached to a manifold body 30 vibrating in the bend mode about axis W.

A pair of drive coils and associated magnets 21R and 21L are mounted at the right and left sides, respectively, of flow tubes 12, 14 to oscillate the flow tubes 12, 14 about the center axis of each flow tube, namely, T and T', respectively, out of phase with respect to the left and right sides of the flowtubes. This vibration is referred to herein as a "twisting" vibrational mode or simply "twist mode." One of ordinary skill in the art will readily recognize that drive coil and magnet 20 positioned on top portions 130 and 130' may be eliminated if drive coils and magnets 21R and 21L are capable of driving the flow tubes 12 and 14 to vibrate in both modes. FIG. 4 is a top view of a single flow tube 12 attached to a manifold body 30 vibrating in the twist mode about axis T. As noted in FIG. 1, each flow tube 12 and 14 is driven to vibrate in the twisting mode about its own axis, T and T', respectively.

Left sensor 16 and right sensor 18 are mounted near the respective ends of the top portions of flow tubes 12, 14 to sense the relative movement of flow tubes 12, 14. This sensing is preferably done by well known techniques applying velocity sensors. Flow tubes 12 and 14 have left side legs 131 and 131' and right side legs 134 and 134'. The side legs converge downwardly toward each other and are affixed to surfaces 120 and 120' of manifold elements 121 and 121'. Brace bars 140R and 140L are brazed to the legs of flow tubes 12, 14 and serve to define the axes W—W and W'—W' about which the flow tubes oscillate out of phase when driver 20 is energized over path 156. The position of axes W—W and W'—W' is determined by the placement of brace bars 140R and 140L on flow tube side legs 131, 131' and 134, 134'.

Temperature detector 22 is mounted on side leg 131 of flow tube 14 to measure the flow tube's temperature and the approximate temperature of the material flowing therein. This temperature information is used to determine changes in the spring constant of the flow tubes. Drivers 20, 21R, and 21L, sensors 16 and 18 and temperature detector 22 are connected to mass flow instrumentation 24 by paths 156, 161, 160, 157, 158 and 159, respectively. Mass flow instrumentation 24 includes at least one microprocessor which processes the signals received from sensors 16, 18, and 22 to determine the mass flow rate of the material flowing through flowmeter 10 as well as other measurements, such as material density and temperature. Mass flow instrumentation 24 also applies a drive signal over path 156 to driver 20 to oscillate flow tubes 12 and 14 in the bend mode out-of-phase about axes W—W and W'—W'. Additionally, instrumentation 24 applies a drive signal over paths 160 and 161 to drivers 21L and 21R, respectively, to oscillate flow tubes 12 and 14 in the twist mode about axis W'''. One of ordinary skill in the art will readily recognize that driver 20 may be eliminated if drivers 21L and 21R are physically and electronically capable of simultaneously driving the flow tubes 12 and 14 in the desired two vibrational modes. Alternatively, the drivers may drive the flow tubes sequentially in the two different modes—one mode at a time.

One of ordinary skill in the art will readily recognize that, depending upon flow tube geometric configurations, a single driver circuit, properly positioned on the flow tubes, may be capable of driving the flow tubes to vibrate in both modes.

Manifold body 30 is formed of casting 150, 150'. Casting elements 150, 150' are attachable to a supply conduit and exit conduit (not shown), by flanges 103, 103'. Manifold body 30 diverts the material flow from the supply conduit into flow tubes 12, 14 and then back into an exit conduit. When manifold flanges 103 and 103' are connected via inlet end 104 and outlet end 104' to a conduit system (not shown), carrying the process material to be measured, the material enters manifold body 30 and manifold element 110 through inlet orifice 101 in flange 103 and is connected by a channel (not shown) having a gradually changing cross-section in casting element 150 to flow tubes 12, 14. The material is divided and routed by manifold element 121 to the left legs 131 and 131' of flow tubes 12 and 14, respectively. The material then flows through the top tubes elements 130, 130' and through the right side legs 134 and 134' and is recombined into a single stream within flow tube manifold element 121'. The fluid is thereafter routed to a channel (not shown) in exit casting element 150' and then to exit manifold element 110'. Exit end 104' is connected by flange 103' having bolt holes 102' to the conduit system (not shown). The material exits through outlet orifice 101' to return to the flow in the conduit system (not shown).

Mass flow instrumentation 24 analyzes signals received on paths 157, 158, and 159 and generates standard output signals on path 155 to indicate mass flow rates utilized by a control system or operator for monitoring and control of the mass flow rate through the associated conduit system (not shown). Mass flow instrumentation 24 also generates output signals on path 162 indicative of pressure within the mass flowmeter. As noted above, the pressure so determined is used within the mass flow instrumentation to correct the mass flow rate computations and may be used independently for other control purposes requiring pressure measurements.

Overview—Pressure Effects on Flow Tube Vibrations

Mass flow rate within a Coriolis effect mass flowmeter is known to be proportional to $\Delta t$ (the time difference measurement discussed above). The mass flow rate may therefore be expressed as:

$$m = CF\Delta t$$

where CF is the calibration factor and m is flow rate. However, as pressure increases or decreases within the flowtubes of the Coriolis effect mass flowmeter, the stiffness of the flow tubes may change. A change in the stiffness of the flow tube affects the mass flow rate sensitivity of the flowmeter. A change in the stiffness of the flow tube also affects the vibrational frequencies of the flow tubes. The ratio between bending mode and twisting mode vibration frequencies of the flow tubes changes in response to pressure changes in the flow tubes. The frequency ratio is therefore related to pressure within the flow tubes (as well as a number of other factors).

Figure 13:
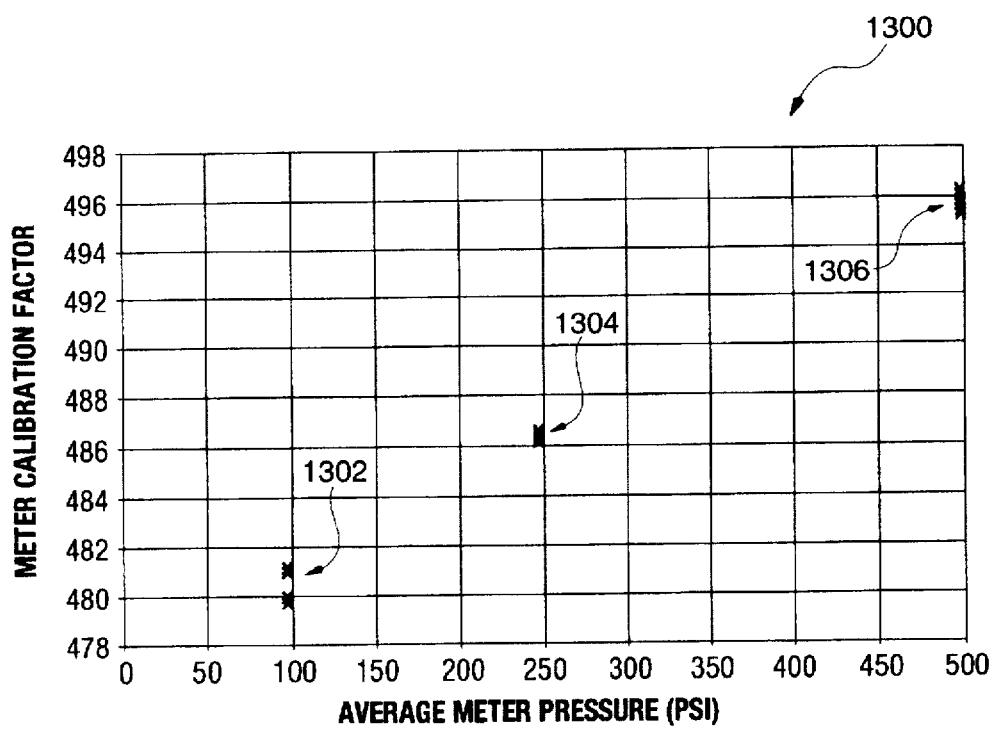
FIG. 13 is a graph depicting a typical relationship between the calibration factor of a mass flowmeter and the pressure within the flowmeter flow tubes.
Figure 14:
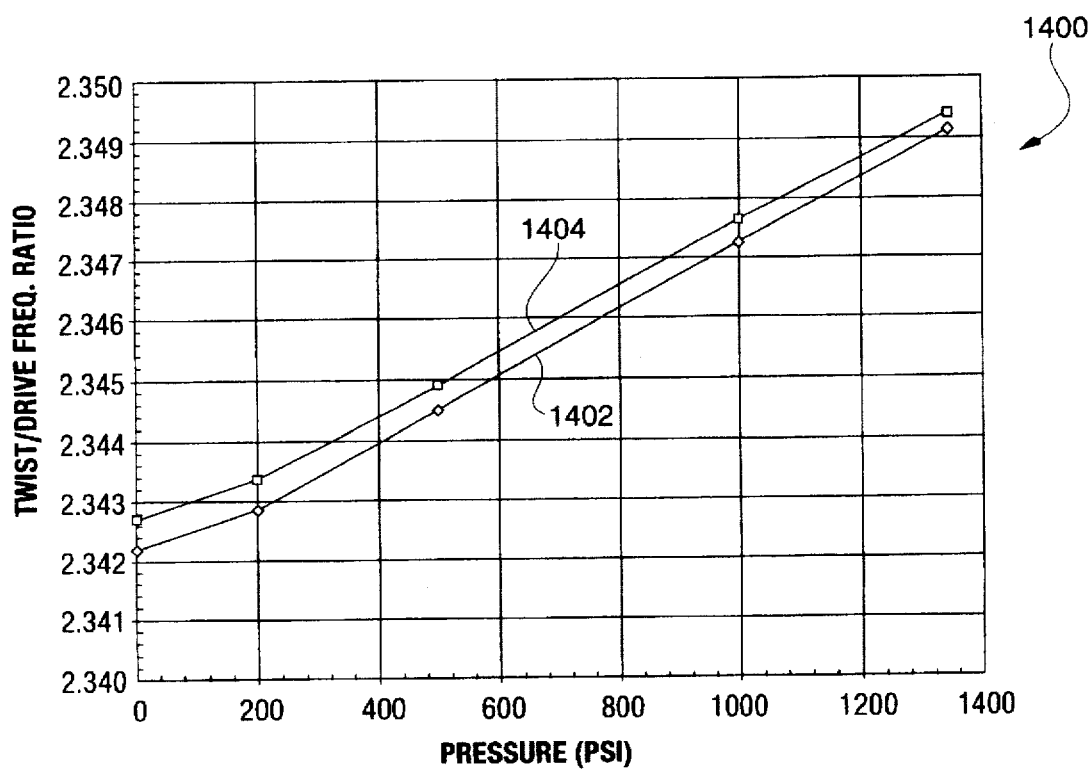
FIG. 14 is a graph depicting a typical relationship between the ratio of twist mode vibration frequency over the bend mode vibration frequency and the pressure within the flowmeter flow tubes.

FIGS. 13 and 14 are graphs of empirical data from operating Coriolis effect mass flowmeters which depict the effects described above. FIG. 13. is a graph depicting typical effects of pressure on the flowmeter calibration factor. Graph 1300 shows meter calibration factor on the y-axis as a function of the pressure within the flow tubes on the x-axis. The plotted data points 1302, 1304, and 1306 are measured data from an operating Micro Motion D300 flowmeter (modified to provide additional drive coils for application of twisting drive force as well as bending drive force). It can be seen in graph 1300 that the calibration factor increases as the pressure within the D300 flow tubes increases.

FIG. 14 is a graph depicting typical effects of pressure on the frequency ratio of the flow tubes. Graph 1400 shows the frequency ratio of twist mode vibration over bend mode vibration on the y-axis as a function of the pressure within the flow tubes on the x-axis. Curves 1402 and 1404 are fitted to measured data points from an operating Micro Motion CMF300 mass flowmeter (modified to provide additional drive coils for application of twisting drive force as well as bending drive force). Specifically, curve 1402 is fitted to data points measured while flowing water through the CMF300 flowmeter and curve 1404 is fitted to data points measured while flowing corn syrup through the CMF300 flowmeter. It can be seen in curves 1402 and 1404 of graph 1400 that the frequency ratio is affected by pressure within the flow tubes (as well as by density of the material flowing therein).

As noted in FIG. 14, material density affects the frequency ratio. Likewise, it can be shown that temperature and mounting parameters of the flow tubes can affect the frequency ratio determination. These factors can be easily characterized and compensated by calibration of the mass flowmeter as used in a particular application. The frequency ratio with these compensations applied thereto is therefore usable as an indirect measure of the pressure within the operating mass flowmeter flow tubes. Details of the required compensation are provided below.

Once the frequency ratio has been appropriately adjusted, it is used to determine the corresponding pressure within the flow tubes. Well known curve fit or table lookup and interpolation numerical techniques may be applied to compute the pressure given the compensated frequency ratio. The pressure so determined may be utilized, per se, as a direct pressure measurement for applications requiring such pressure determinations.

In addition, the pressure so determined is used to correct the calibration factor of the mass flowmeter to thereby correct the mass flow rate measurements thereof. The pressure is used to determine a pressure correction factor which is then applied to correct the mass flow determination. The mass flow rate within the vibrating flow tubes is therefore determined as:

m=CF CPΔt where CF and Δt are as above and CP is a pressure correction factor. This pressure correction factor is determined at calibration of the mass flowmeter and is computed as a function of the computed pressure as follows:

$$CP=1+((K_p/100)(P-P_0))$$

where $K_p$ is a pressure calibration factor (expressed as a percentage per psi of pressure), P is the pressure (determined as above) within the flow tubes, and $P_0$ is the calibration line pressure (i.e., the nominal pressure used to calibrate the flowmeter for normal operation in its intended application). Pressure calibration factor $K_p$ and calibration line pressure $P_0$ are determined through standard factory or in situ calibration techniques well known to those of ordinary skill in the art.

Overview—Mass Flow Instrumentation present invention comprises digital signal processing methods operable within a digital signal processor (DSP) chip to perform the computational functions within mass flow instrumentation 24. Discrete samples are taken of the analog signals generated as output from each of the flow tube sensors. The discrete samples from the left and right sensors are digitized by use of standard analog to digital conversion (A/D) devices. Once digitized, further processing of the samples is performed by digital signal processing methods within the DSP chip.

Figure 12:
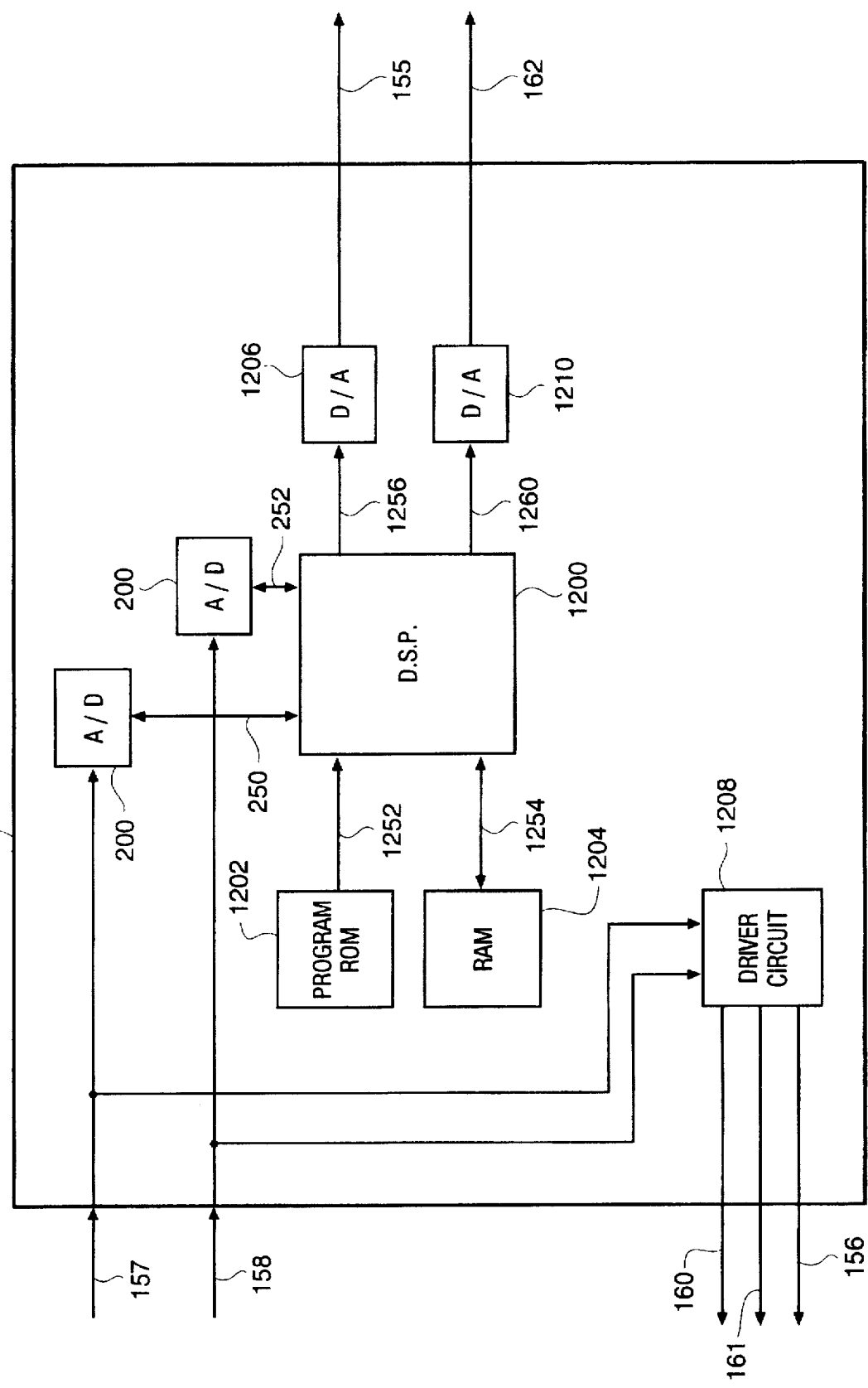
FIG. 12 is a block diagram which depicts integrated circuit devices within the mass flow instrumentation of FIG. 1.

This digital signal processing software (discussed below) is operable on mass flow instrumentation 24 shown in greater detail in FIG. 12. Digital signal processor 1200 of FIG. 12 is a computing device much like any common microprocessor but with special purpose functions tuned for application to signal processing tasks. Many such DSP processor devices are known to those skilled in the art. One example of such a device is the Texas Instruments TMS 320C31. This device includes a hardware floating point processing unit to enhance the performance of the signal processing computations. One of ordinary skill in the art will readily recognize that fixed point signal processing devices may be employed in conjunction with software emulation libraries for precision floating point computations where, for example, cost considerations of the particular application overshadow performance considerations.

Processor 1200 reads program instructions from program ROM 1202 over bus 1252 and manipulates data and buffers in RAM 1204 over bus 1254. One of ordinary skill will recognize that, depending upon several cost and performance factors, it may be preferable under certain circumstances to copy the program instructions from ROM 1202 to RAM 1204 to improve the performance of processor 1200 in fetching instructions.

A/D converters 200 each receive an analog signal from their respective flow tube sensor output signals applied to paths 157 and 158, respectively. Processor 1200 applies control signals to A/D converters 200 over paths 250 and 252, respectively, and receives digitized sample values from the A/D converters 200 over paths 250 and 252, respectively. One of ordinary skill in the art will readily recognize that clocking signals required by the various components may be generated by any well known clock generation techniques such as crystal controlled oscillators, or any of several commercially available clock generation integrated circuits.

In the preferred embodiment, A/D converters 200 are embodied within a single integrated circuit with multiple converters and a single communication bus connection to the DSP processor. This helps assure that the phase relationship between the two sampled signals is due to the Coriolis effects of the vibrating flow tubes rather than effects of signal trace routing on a printed circuit board to physically separate A/D converter circuits. Many such stereo A/D converter chips are known to those skilled in the art. One example of such a chip is the Crystal Semiconductors CS5329, a 2-channel stereo A/D converter device.

Processor 1200 determines a Δt value from the phase difference between the sampled channels and applies a signal proportional to Δt to path 1256. D/A converter 1206 converts the digital signal value applied to path 1256 into an analog signal proportional to mass flow rate applied to path 155. Processor 1200, in accordance with the present invention also determines the pressure within the Coriolis effect mass flowmeter from the sampled channels and applies a signal proportional to the pressure to path 1260. D/A converter 1210 converts the digital signal value applied to path 1260 into an analog signal proportional to pressure applied to path 162. The signal on paths 155 and 162 are applied to utilization means (not shown) appropriate to the particular flowmeter measurement application.

Driver circuit 1208 receives the analog signals applied to paths 157 and 158 generated by left and right channel sensors. Driver circuit 1208 isolates the bending mode frequency and the twisting mode frequency. Driver circuit 1208 determines the sum of the left and right channel signals as well as the difference between the left and right channel signals to isolate the bending mode frequency from the twisting mode frequency. The signals applied to the left and right channel signal paths induced by the bending mode vibrations are substantially in phase while the signals induced thereon by twisting mode vibrations of the flow tubes are substantially out of phase (approximately 180°). The sum of the left and right channel signals therefore has a strong frequency component in the bending frequency and a significantly diminished frequency component in the twisting frequency. Conversely, the difference between the left and right channel signals has a strong frequency component in the twisting mode frequency and a significantly diminished frequency component in the bending mode frequency.

Figure 10:
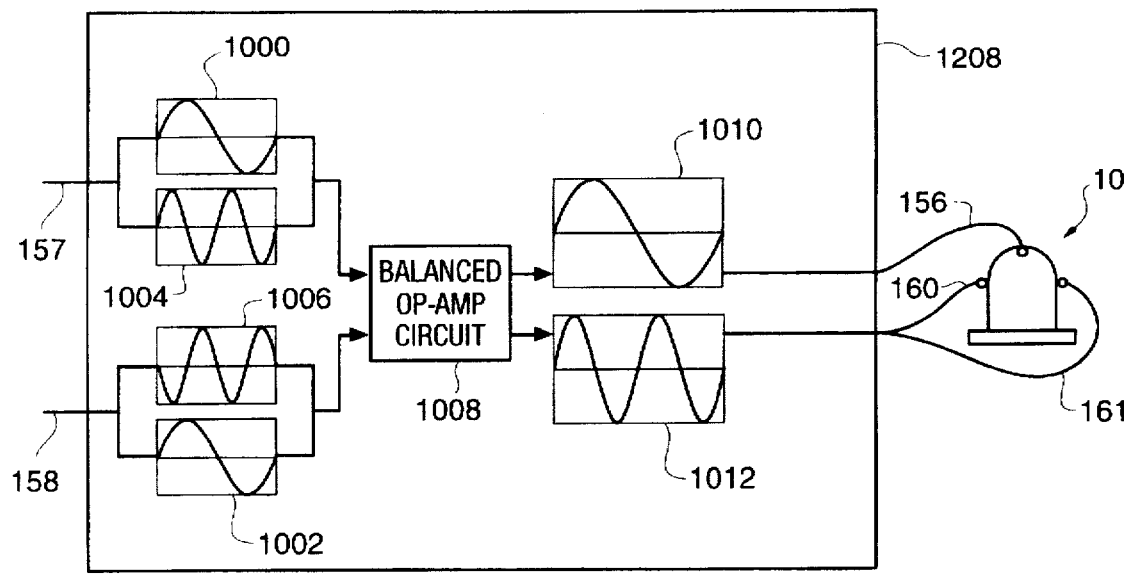
FIG. 10 is a block diagram of the driver circuit of FIG. 2 which isolates the desired fundamental frequencies of the vibrating flow tubes using a sum/difference method.
Figure 11:
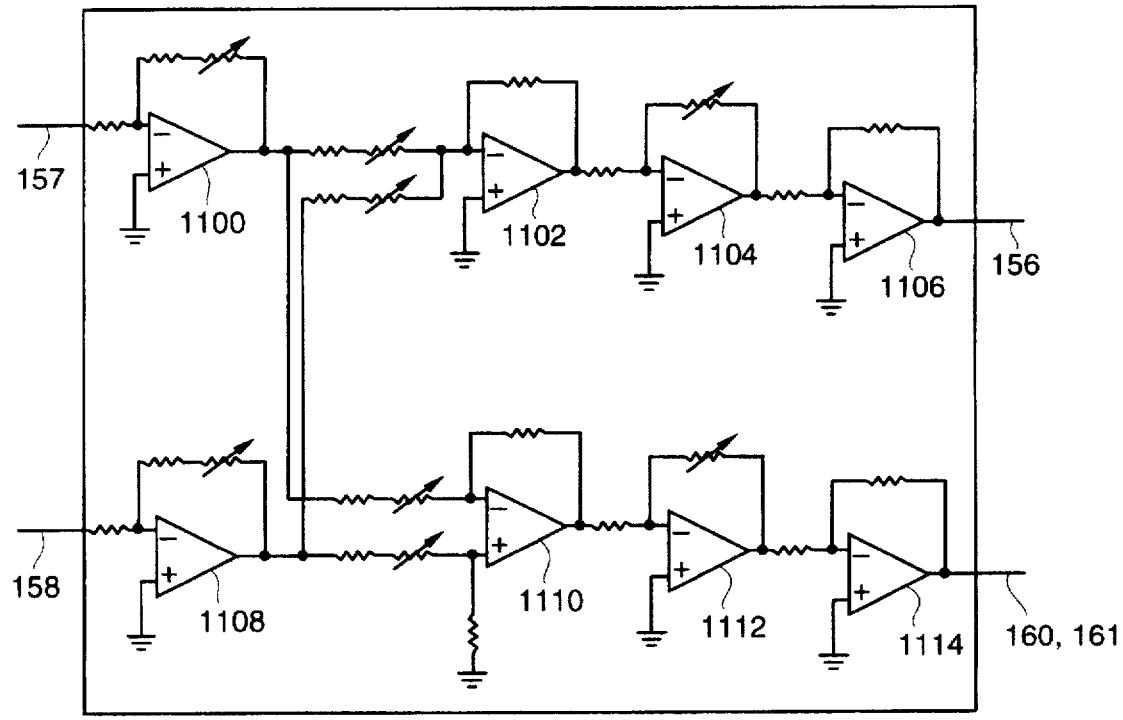
FIG. 11 is a circuit diagram of the balanced op-amp circuit of FIG. 10.

FIGS. 10 and 11 describe driver circuit 1208 in additional detail. Balanced op-amp circuit 1008 of FIG. 10 combines the signals from the left and right channels to produce the sum and difference of the signals as noted above. Graphs 1000 and 1004 on path 157 depict the superposition of the bending mode and twisting mode vibrations respectively on path 157. Likewise, graphs 1002 and 1006 depict the superposition of the bending mode and twisting mode vibrations respectively on path 158. It is noted that graphs 1000 and 1002, depicting the bending mode vibration induced signals, are substantially in phase while graphs 1004 and 1006, depicting the twisting mode vibration induced signals, are substantially out of phase. Graph 1010 depicts the sum of the left and right channel signals produced by balanced op-amp circuit 1008 and applied to path 156 while graph 1012 depicts the difference of the left and right channel signals produced by balanced op-amp circuit 1008 and applied to paths 160 and 161. One of ordinary skill in the art will recognize that the signals applied to paths 156, 160, and 161 must be amplified and conditioned prior to their being applied as driver signals to flowmeter 10. It is noted that the frequency depicted in graph 1010 is the bending mode frequency component of the signals from the left and right channels while the frequency depicted in graph 1012 is the twisting mode frequency component of the same signals. The sum/difference method of circuit 1008 isolates the two components of the superposed signals on each of the channels. FIG. 11 shows the cascaded op-amps which comprise the balanced op-amp circuit 1008 of FIG. 10.

One of ordinary skill in the art will readily recognize digital processing techniques equivalent to the driver circuit 1208 discussed above. The general design of the driver circuit 1208 discussed above relies upon the fact that the sensor output signals from the flow tube sensors are 180° out of phase with respect to one another with respect to twisting mode vibrations whereas the sensor signals are in phase with respect to bending mode vibrations. This fact enables the use of the sum/difference analog circuit design discussed above to isolate the two vibration mode frequencies superposed on the sensor output signals. Digital variants of the analog circuit will be evident to those of ordinary skill in the art. In addition, other vibration modes may be employed by the methods of the present invention in which the 0° and 180° phase relationships noted above may not exist. In such cases, well known digital signal processing techniques may be employed to provide for the isolation of the various vibrational mode frequencies and for the generation of appropriate drive signals.

Signal Processing Methods—Frequency Determination

Figure 2:
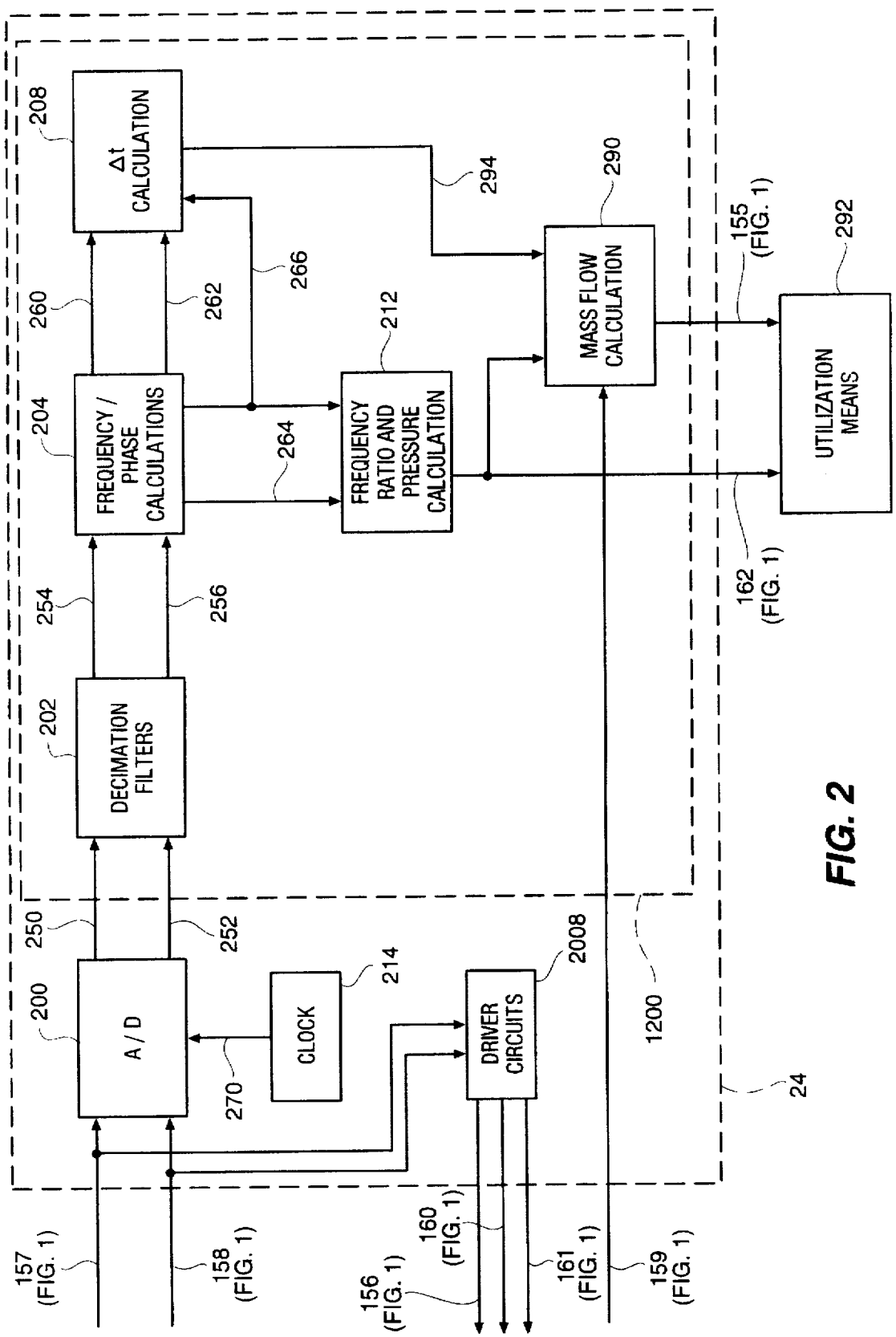
FIG. 2 is a block diagram depicting additional details of the mass flow instrumentation of FIG. 1.

FIG. 2 depicts the general structure of, and associated flow of information in, the flowmeter instrumentation 24 of the present invention and in particular the flow of information and computations within DSP 1200. The meter electronics of the present invention is comprised of two essentially identical "channels": a first channel for processing the left flow tube sensor output signal and a second channel for processing the right flow tube sensor output signal. The two "channels" are fundamentally symmetric except with respect to the weight adaptation of the notch filters as discussed below.

The following discussion is presented in terms of a typical Coriolis flowmeter application in which the fundamental frequency of the bending mode vibrating flow tubes is approximately 100 Hz. A typical twisting mode frequency corresponding to this exemplary bending mode frequency may be, for example, approximately 250 Hz. Other flow tube configurations may vibrate at other frequencies corresponding to other ratios which may be similarly useful in determining pressure and correcting mass flow rate measurements therefrom. It will therefore be readily recognized by those of ordinary skill in the art that the apparatus and methods of the present invention may be applied to many combinations of vibrational modes and frequencies.

Computations performed by DSP 1200 are shown as computational element blocks within DSP 1200 in FIG. 2. Many of the computational elements discussed below operate synchronously with clock signals associated with various samples of the flow tube sensor output signals. CLOCK 214 of FIG. 2 provides clocking signals associated with the various sampling rates of the computational elements discussed below. It is to be understood that clock signals required for operation of the signal processing methods within mass flow instrumentation 24 are supplied as appropriate by CLOCK 214. Timing of various computations within the elements depicted in FIG. 2 may be further "clocked" (or gated) by the availability of signals from an earlier computational stage. In other words, each computational block depicted within DSP 1200 of FIG. 2 may operate synchronously with respect to availability of data from an earlier computation. CLOCK 214 therefore conceptually supplies the clocking for all computations in that all computational elements depend upon earlier intermediate computations which in turn depend upon the precisely clocked digitized samples generated by A/D converters 200.

The data paths indicated in FIG. 2 joining the various computational elements inside DSP 1200 represent the passing of data from one computational element or stage to another. One of ordinary skill in the art will readily recognize that equivalent computations may be factored into a variety of similar forms such that different intermediate steps of the computations may be shown as passed among the various computational elements. The particular decomposition of the computations into elements shown as blocks in FIG. 2 is a matter of choice for clarity of discussion. The precise methods are discussed below with respect to flowcharts of FIGS. 7–9.

CLOCK 214 supplies a periodic pulsed signal clock to A/D converters 200 over path 270 to determine the sampling rate of the raw (unprocessed) signals generated by the flow tube sensors. Each A/D converter 200 samples its corresponding analog signal and converts the sampled value to digital form once for each signal pulse applied to path 270 by CLOCK 214. This clock signal applied to A/D converters 200 over path 270 must have a highly accurate frequency to permit sampling of the flow tube sensor output signals at a fixed sampling rate as required for the processing of the present invention. This clock pulse accuracy is preferably achieved by use of a crystal controlled clock. To the extent CLOCK 214 is programmable in nature, DSP 1200 programs parameters of the operation of CLOCK 214 through appropriate registers of CLOCK 214.

The output signal from the right flow tube sensor 18 of FIG. 1 is applied to A/D converter 200 over path 158 of FIG. 1. The output signal from the left flow tube sensor 16 of FIG. 1 is applied to A/D converter 200 over path 157 of FIG. 1. A/D converter 200 samples and converts the analog signals from the flow tube sensors to digital values. A/D converters 200 operate responsive to the fixed frequency periodic clock signal received on path 270 supplied by a system wide CLOCK 214.

The converted digital value corresponding to the right channel sensor output is applied over path 252 to 48:1 decimation filter element 202. 48:1 decimation filter elements 202 are operable within DSP 1200 in response to each sample received from the A/D converters 200 on the channels. The decimation filter elements 202 reduce the number of samples by a factor of 48 while providing significant anti-aliasing filtration of the sampled signal values. One of ordinary skill in the art will recognize that the particular decimation ratio of 48:1 is a matter of engineering design choice depending upon the particular application environment. The 48:1 decimation filter element 202 is done in two stages, an 8:1 stage followed by a 6:1 stage. Both stages of decimation filter element 202 are preferably implemented as finite impulse response (FIR) anti-aliasing filters. Preferably, the FIR filters are designed and implemented using the well known Remez algorithm which generates an optimal tiger. One of ordinary skill in the are will recognize that an infinite impulse response (IIR) filter may also be used for the decimation stages. Use of FIR versus IIR filtration is a matter of design choice based on computational complexity and the relive power of the computational elements used in a particular design.

The first stage of decimation filter element 202 performs an 8:1 reduction in the sample rate from approximately 39.1 kHz to approximately 4.9 kHz. For this first stage, the passband ends approximately 300 Hz and the stopband begins at approximate 2319 Hz. The passband of the firm stage has a weight of 1 and the stopband has a weight of approximately $10^4$. The kernel has length 72. The second age of decimation filter element 202 performs a 6:1 reduction in the sample rate from approximately 4.9 kHz to approximately 814 Hz. For the second stage, the passband ends at approximately 300 Hz, the stopband begins at approximately 400 Hz, the pass band has weight 1, the stopband has weight $10^4$, and the kernel has length 181.

Kernel coefficients for the first stage decimator filter are preferably:

−0.00000081764524630121
0.00000698245451987758
0.00001773963885136871
0.00003898240757193200
0.00007548672488844681
0.00013409289751968492
0.00022348636822400024
0.00035427612800655528
0.00053901217722666664
0.00079209847140532400
0.00112956940174060416
0.00156872083590591968
0.00212758437199228352
0.00282427204255895904
0.00367616275994291200
0.00469898731907314112
0.00590584018301447296
0.00730617267761646208
0.00890478563478318592
0.01070092291349931840
0.01268750876431035520
0.01485057644139987840
0.01716893380830959680
0.01961418511740982400
0.02215097935643592320
0.02473769406056195200
0.02732738160877671360
0.02986905691870672640
0.03230924399368606080
0.03459371442646413440
0.03666937963516617600
0.03848619661702702080
0.03999990535491161216 0
0.04116950605355454720
0.04196728384459161600
0.04237150120084636160
0.04237150120084636160
0.04196728384459161600
0.04116950605355454720
0.03999990535491161216 0
0.03848619661702702080
0.03666937963516617600
0.03459371442646413440
0.03230924399368606080
0.02986905691870672640
0.02732738160877671360
0.02473769406056195200
0.02215097935643592320
0.01961418511740982400
0.01716893380830959680
0.01485057644139987840
0.01268750876431035520
0.01070092291349931840
0.00890478563478318592
0.00730617267761646208
0.00590584018301447296
0.00469898731907314112
0.00367616275994291200
0.00282427204255895904
0.00212758437199228352
0.00156872083590591968
0.00112956940174060416

0.00079209847140532400
0.00053901217722666664
0.00035427612800655528
0.00022348636822400024
0.00013409289751968492
0.00007548672488844681
0.00003898240757193200
0.00001773963885136871
0.00000698245451987758
−0.00000081764524630121

Kernel coefficients for the second age decimator filter are preferably:

0.00000442476810646958
0.00000695183248940121
0.00000923764143759751
0.00000714413514201519
−0.00000492704497770928
−0.00003489048179859716
−0.00009263530705114960
−0.00018905831520468072
−0.00033444730957182660
−0.00053626977796454416
−0.00079662003202712672
−0.00110972681566274544
−0.00146004062478959264
−0.00182142399675758176
−0.00215800240585865472
−0.00242694026625900160
−0.00258321531356594560
−0.00258595488430649824
−0.00240572194854850240
−0.00203154744227315104
−0.00147645851005435168
−0.00078021447557776288
−0.00000817274057693339
0.00075426709707067504
0.00141150795697302464
0.00187095161052143488
0.00205783908806485888
0.00192943571960413760
0.00148598692512453856
0.00077606363427304864
−0.00010548433903324906
−0.00102764398217807344
−0.00184078746460040160
−0.00239957337125188800
−0.00258787044696211360
−0.00234158106765920384
−0.00166505851114574304
−0.00063743956961237104
0.00059343304869999640
0.00182986089451760448
0.00285400415538192992
0.00346436214815012608
0.00351321839727078272
0.00293841932540287360
0.00178313427507570240
0.00019874998215256696
−0.00157142938076768256
−0.00322673006618933952
−0.00445756082164491968
−0.00500041373054022336
−0.00469011227472791616
−0.00349953894849836288
−0.00155835913437617184
0.00085478554892281696
0.00334786697510189632

0.00547518370123789568
0.00681278906253363456
0.00703755587107394560
0.00599594663350389504
0.00374906069643158208
0.00058348227032761616
−0.00301740455601272832
−0.00644042362264125952
−0.00903974843902937216
−0.01024986918050410880
−0.00969589010450159232
−0.00728139494412460544
−0.00323617204253763328
0.00188855897383295168
0.00728184827350282496
0.01198668054361748960
0.01505134116424442240
0.01569656324736917120
0.01347199361008710720
0.00837503599972582272
0.00090911821339905088
−0.00793352759778378240
−0.01676840904279348800
−0.02398607719808193280
−0.02796978000715982080
−0.02733379993624548160
−0.02114770650772032640
−0.00911189426247965824
0.00834468626759415936
0.03006335482259185280
0.05425620094049752960
0.07869841218265049600
0.10098866498628454400
0.11884306255675470400
0.13038232897640233600
0.13437210128885929600
0.13038232897640233600
0.11884306255675470400
0.10098866498628454400
0.07869841218265049600
0.05425620094049752960
0.03006335482259185280
0.00834468626759415936
−0.00911189426247965824
−0.02114770650772032640
−0.02733379993624548160
−0.02796978000715982080
−0.02398607719808193280
−0.01676840904279348800
−0.00793352759778378240
0.00090911821339905088
0.00837503599972582272
0.01347199361008710720
0.01569656324736917120
0.01505134116424442240
0.01198668054361748960
0.00728184827350282496
0.00188855897383295168
−0.00323617204253763328
−0.00728139494412460544
−0.00969589010450159232
−0.01024986918050410880
−0.00903974843902937216
−0.00644042362264125952
−0.00301740455601272832
0.00058348227032761616
0.00374906069643158208

0.00599594663350389504
0.00703755587107394560
0.00681278906253363456
0.00547518370123789568
0.00334786697510189632
0.00085478554892281696
−0.00155835913437617184
−0.00349953894849836288
−0.00469011227472791616
−0.00500041373054022336
−0.00445756082164491968
−0.00322673006618933952
−0.00157142938076768256
0.00019874998215256696
0.00178313427507570240
0.00293841932540287360
0.00351321839727078272
0.00346436214815012608
0.00285400415538192992
0.00182986089451760448
0.00059343304869999640
−0.00063743956961237104
−0.00166505851114574304
−0.00234158106765920384
−0.00258787044696211360
−0.00239957337125188800
−0.00184078746460040160
−0.00102764398217807344
−0.00010548433903324906
0.00077606363427304864
0.00148598692512453856
0.00192943571960413760
0.00205783908806485888
0.00187095161052143488
0.00141150795697302464
0.00075426709707067504
−0.00000817274057693339
−0.00078021447557776288
−0.00147645851005435168
−0.00203154744227315104
−0.00240572194854850240
−0.00258595488430649824
−0.00258321531356594560
−0.00242694602625900160
−0.00215800240585865472
−0.00182142399675758176
−0.00146004062478959264
−0.00110972681566274544
−0.00079662003202712672
−0.00053626977796454416
−0.00033444730957182660
−0.00018905831520468072
−0.00009263530705114960
−0.00003489048179859716
−0.00000492704497770928
0.00000714413514201519
0.00000923764143759751
0.00000695183248940121
0.00000442476810646958

The left channel, comprising A/D converter 200 and decimation filter element 202 connected via path 250, operates identically to the above-discussed right channel. A/D converter 200 receives the signal generated by the left sensor 16 over path 157, converts the analog signal to digital form, and applies the digital value over path 250 to decimation filter 202 for the left channel. The output of decimation filter element 202 for the left channel applies its output signal to path 254 for further processing and for the right channel applies its output to path 256 for further processing.

The computations of the decimation stages preferably utilize floating point arithmetic to maintain the computational accuracy required. Subsequent computations for the notch filtration, phase computations, Δt computations, and mass flow rate computations are also preferably performed using floating point arithmetic due to the wide range of computational scaling involved with the more complex functions.

The anti-aliased, decimated, digitized signal values for the right channel are applied over path 256 to frequency/phase calculation element 204. Likewise, the anti-aliased, decimated, digitized signal values for the left channel are applied over path 254 to frequency/phase calculation element 204. Frequency/phase calculation element 204, discussed in detail below, enhances the signal values. This process isolates signals generated by the bending mode vibrational movements of the flow tubes from the various harmonics, noise, and from the twisting mode vibrational movements. The frequency/phase calculation element 204 eliminates a band of frequencies (a notch) centered about the fundamental frequency of the flow tubes vibrating in the bending mode. The resultant signal represents all noise outside the notch centered about the fundamental frequency of the flow tubes vibrating in the bending mode. This noise signal is then subtracted from the signal applied as input to the frequency/phase calculation element 204 over path 256 which is the sum of the fundamental frequency and all noise not filtered by decimation filter element 202. The result of the subtraction, which represents the fundamental frequency of the vibrating flow tubes filtered of most noise signals, is then applied to path 262 as the output of the frequency/phase calculation element 204. Values indicative of the phase of each of the left and right channel output signals are generated within frequency/phase calculation element 204 and are applied over paths 260 and 262, respectively, to Δt calculation element 208. The parameters (weighting factors or coefficients and the debiasing parameter) of the frequency/phase calculation element 204 determine the characteristics of the notch, namely the shape of the notch (bandwidth of frequencies rejected) and the fundamental frequency at which the notch is centered. The parameters are computed by weight adaptation elements within the frequency/phase calculation element 204. The calculations required for adaptation of the notch filters are discussed in additional detail below. Both the shape of the notch and the fundamental frequency about which the notch is centered may be adapted to track changes in the fundamental frequency. The shape of the notch determines the speed with which the notch filters can track changes in the fundamental frequency. A wider notch provides less filtration but may be more rapidly adjusted to changes in the fundamental frequency. A narrower notch converges more slowly to changes in the fundamental frequency but provides superior filtration of the input sensor signals. In the preferred embodiment it is believed that the shape of the notch need not be altered. Empirical data reveals that the programmable filters are capable of tracking normal changes in their respective input signals without the need to alter the shape of their respective notches.

The weight adaptation parameters computed within frequency/phase calculation element 204 are applied to both the left and right channel so that both sensor signal output channels are processed identically. Using a single set of parameters applied to both the left and right channels serves to maintain the critical phase relationship between the two channels. This relationship is used to compute the Δt value which is proportional to mass flow rate.

The fundamental frequency of the bending mode flow tube vibrations is computed by the frequency/phase calculation element 204 and applied to path 266 as input to the Δt calculation element 208. The enhanced signals are further processed by a Goertzel filter within the frequency/phase calculation element 204 to determine the phase of the signals as required for the eventual Δt computation by element 208. Values indicative of the phase of the bending mode vibrating tubes are generated within frequency/phase calculation element 204 and applied to paths 260 and 262 corresponding to the left and right channels, respectively.

Phase computations within element 204 use Fourier transform techniques with two Hanning windows to determine the phase of the filtered signals. The length of a window is a function of the nominal or expected flow tube fundamental frequency. The length of a window determines a number of oscillatory cycles of the flow tubes over which samples are gathered and weighted to determine the phase of the flow tubes. The expected flow tube frequency may be programmed into the electronics of the present invention at time of manufacture, or may be entered as a parameter at a particular installation/application site, or may be determined by operation of the flowmeter and appropriate measurements. The length of a window represents a tradeoff between response time and rejection of noise due to leakage. A larger number of cycles accumulated to determine the phase provides for additional rejection of noise but requires additional delay and therefore slows response to changes in the flow tube vibration phase relationship. Fewer samples reduces the delay and therefore improves the speed of response to flow tube vibration phase changes, but provides inferior noise rejection. Eight flow tube cycles is selected as the preferred window length as measured in cycles. Assuming a given expected frequency, the preferred window size (2N) is determined as:

window_length=2floor(3200/expected_tube_frequency)

where floor(x) is the largest integer less than or equal to x.

The Hanning window is represented as a vector of weights to be applied to the discrete samples over the period of one Hanning window. Where 2N is the number of discrete samples within one period of the Hanning window, the weight for the k'th discrete sample where k ranges from 0 to 2N−1 is determined as:

h(k) =½(1−cos (2πk/(2N−1)))

A half window signal condition is asserted (within the software methods of the present invention) every N discrete samples (where a complete Hanning window of the sampled sensor output signal has 2N discrete samples in a single period) for purposes discussed in detail below relating to parallel computations of overlapping Hanning windows. In addition, a counter variable (e.g., named SAMPNO within the methods of the present invention) counts the sample number index within a presently sampled Hanning window (e.g., as a modulo N function from 0 to N−1). The SAMPNO counter variable increments with the processing of each enhanced sample from the frequency/phase calculation element 204. When SAMPNO reaches N−1 the next sample value resets SAMPNO to 0. The half window signal corresponds to the SAMPNO counter being equal to zero. In the preferred embodiment of the present invention, the SAMPNO counter is implemented in software which counts the number of discrete decimated sampled sensor output signal values processed during a Hanning window. One of ordinary skill in the art will recognize many equivalent structures and functions to implement this function either in a software design or in equivalent circuit structures.

The signal samples at the edges of each window are given lower weights than those toward the middle of the window. To more fully utilize the available data, two Fourier calculations are done simultaneously such that the windows overlap by one half of a window length. New Fourier phase measurements are therefore produced for each channel every half window of samples.

The use of a constant window size in the present invention allows the Hanning window weights to be pre-computed before flow measurements begin. When used in conjunction with a discrete-time Fourier transform (DTFF), as in the present invention, the window size determines the sharpness of the frequency discrimination characteristic of the DTFT filter output and thus the rejection of noise, pseudo-harmonics, and leakage. A longer window size provides slower response of the filter to changes in phase. The window size as determined above represents the best known approximation suited to balancing the competing goals of improved frequency discrimination and noise rejection versus rapid response to phase changes. The preferred window size may be changed for different flowmeter applications to optimize for certain environmental conditions.

Phase computations performed within frequency/phase calculation element 204 sum the filtered discrete sampled values to generate a complex number indicative of the phase of the sampled, filtered sensor output signal. This complex number is used in subsequent Δt computations. Specifically, a Goertzel filter Fourier transform is applied to each Hanning window of filtered, discrete sampled sensor output signal values to determine the Fourier component at the bending mode frequency of both the right and left channels. The coefficients of the Goertzel filter are determined by the frequency computations within frequency/phase calculation element 204 based on the average of the RML bend frequency coefficient (discussed below) for the preceding Hanning half window of enhanced signal values. The phase computations for the left channel and for the right channel operate identically.

Δt calculation element 208 determines the time delay resultant from the phase difference between the left and right sensor output signals as received from element 204 via paths 260 and 262. The time delay so determined is used in conjunction with the frequency estimates of the flow tubes' bending mode vibrations received from element 204 via path 266 to determine the mass flow rate of the material flowing through the flow tubes of the Coriolis flowmeter.

The Fourier component (a complex number indicative of phase) of the left channel (received by Δt calculation element 208 on path 260) is multiplied by the conjugate of the Fourier component of the right channel (received by Δt calculation element 208 on path 262). The angle of the complex result is then computed. This phase difference angle is divided by the tube frequency of the bending mode vibrating flow tubes (received by Δt calculation element 208 on path 266 and converted to appropriate units to match the phase measurements) to produce a Δt value. The Δt value so determined by the Δt calculation element 208 is applied to the mass flow calculation element 290 over path 294. The mass flow calculation element 290 determines the mass flow rate of material flowing through the flowmeter in proportion to the Δt value applied to its input path 294. As is known in the art, the mass flow rate computations may be corrected for temperature variations as sensed by sensor 22 and transmitted to mass flow calculation element 290 via path 159.

The mass flow rate determined by mass flow calculation element 290 is further corrected by the pressure measurement value applied to its input path 162. The corrected mass flow rate is then applied, via output path 155, to a utilization means 292 which utilizes the corrected mass flow rate for control of the underlying process.

In addition to the determination of mass flow rate from the bending mode vibration of the flow tubes (as summarized above), the twisting mode vibration of the flow tubes is used by computation elements within mass flow instrumentation 24 to determine the pressure within the flowmeter. As noted above, the pressure within the flowmeter may affect the accuracy of the flow rate measurements. The pressure measurement within mass flow instrumentation 24 is therefore used to correct the mass flow rate calculations summarized above. The decimated sampled values from the left and right channels are applied via paths 254 and 256, respectively, to frequency/phase calculation element 204 as discussed above. Frequency/phase calculation element 204 enhance the decimated sampled signal values from each channel to isolate signals generated by the twisting mode vibrational movements of the flow tubes from the various harmonics, noise, and from the bending mode vibrational movements.

Frequency/phase calculation element 204 determines the fundamental frequency of the twisting mode vibrations of the flow tubes and applies that frequency to path 264. Similarly, frequency/phase calculation element 204 determines the fundamental frequency of the bending mode vibrations of the flow tubes and applies that frequency to path 266. Frequency ratio and pressure calculation element 212 receives the frequencies so determined via paths 264 and 266 and determines the pressure within the flowmeter as a function of the ratio of the two frequencies.

Frequency/Phase Filtration Methods

Figure 6:
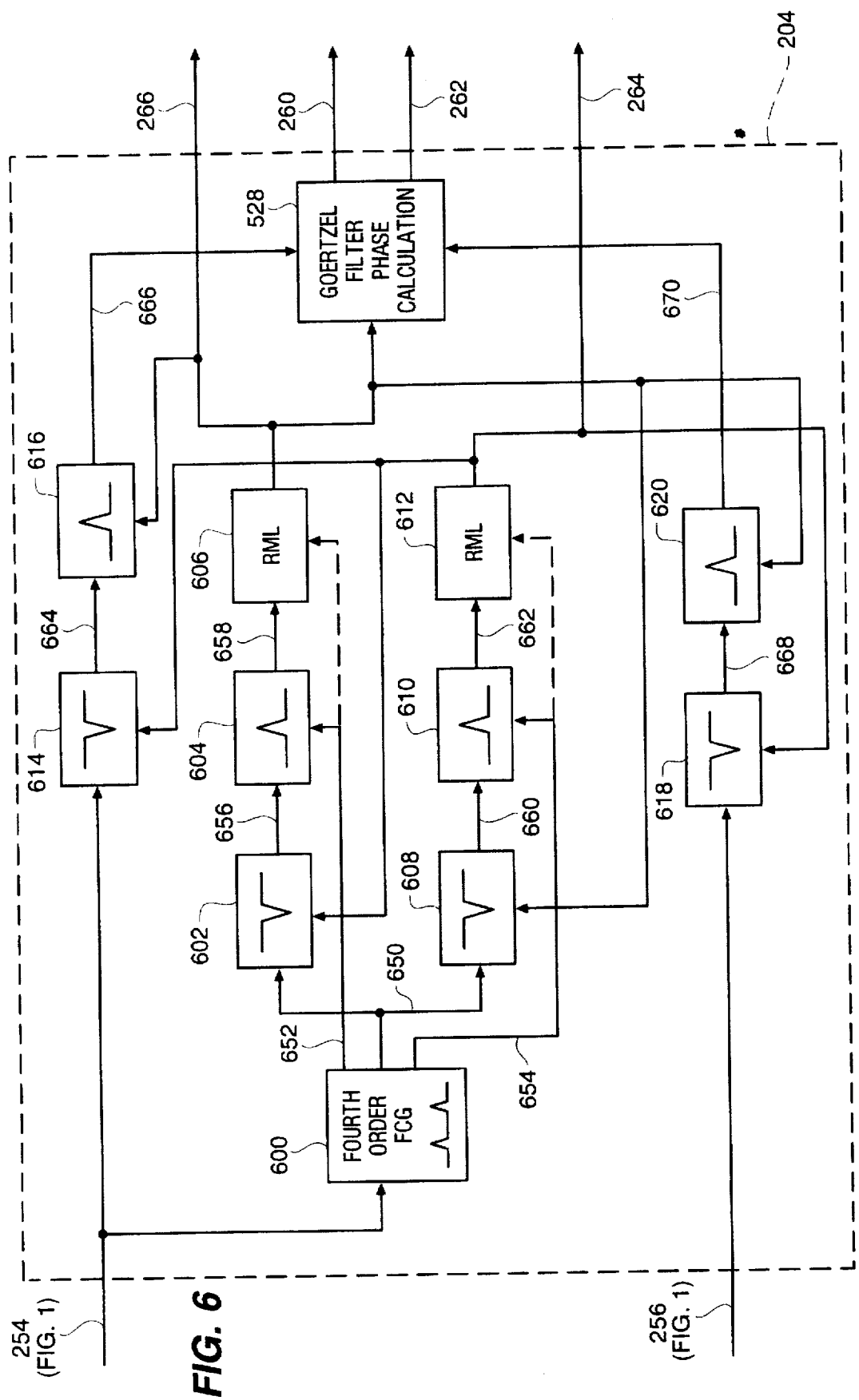
FIG. 6 is a block diagram depicting the various digital filters applied to isolate and enhance signals processed by the programs in the DSP within mass flow instrumentation of FIG. 1 using the alternative embodiment fourth order filter method of the present invention.

The frequency/phase calculation element 204 of FIG. 2 is adapted to enhance the signals generated by the left channel motion sensor and the right channel motion sensor attached to the vibrating flow tubes. The shape of the notch (e.g., the width of the notch frequencies), and the center frequency of the notch are both adaptable by weighting computations within frequency/phase calculation element 204 of FIG. 2. In the preferred embodiment of the present invention, the shape of the notch in the various notch filters (i.e., the notch width or pass bandwidth) need not be altered in order to assure tracking of reasonable changes which may be expected in their respective input signals. FIGS. 5 and 6 show additional details of two embodiments of the frequency/phase calculation element 204 of FIG. 2. Frequency/phase calculation element 204 of FIG. 2 comprises a network of digital notch filters and digital band pass filters together with appropriate adaptation computational elements to adapt the various digital filters to changes in the bend mode and twist mode frequencies. The various digital filters are cascaded to permit rapid convergence of the filter parameters in response to changes in the center frequency of the respective filters while maintaining highly accurate digital filtration of the signals.

In general, a notch filter having a wide frequency response (so called "low Q") is used in conjunction with a fast conjugate gradient (FCG) algorithm for adapting the coefficients of the filter. This combination is also referred to herein as an "FCG filter." The FCG filter processes incoming signals from the left and right sensor channels and rapidly converges to an estimate of the fundamental frequencies (both bending and twisting mode vibration frequencies). Digital notch filters and digital band pass filters are then adapted to center on the estimated fundamental frequencies, derived from the FCG digital processing, to enhance each of the two fundamental frequencies. The recursive maximum likelihood (RML) algorithm is then used in conjunction with digital filters having a narrower frequency response (so called "high Q") to further refine the response of the digital notch filters and band pass filters thereby enhancing their respective input signals. The RML filters accurately determine the bending and twisting mode frequencies of the vibrating flow tubes and applies these frequencies to output paths of frequency/phase calculation element 204 for further processing by pressure calculation element 212 of FIG. 2.

In addition, the bending mode frequencies of both the left and right channel sensor output signals, as enhanced by the digital filtration within frequency/phase calculation element 204, are applied to a Goertzel filter within element 204 for phase measurement computations. Phase values of the left and right channel sensor output signals corresponding to the bending mode vibrations of the flow tubes are applied to output paths of the frequency/phase calculation element 204 for further processing by Δt calculation element 208 of FIG. 2.

Frequency/Phase Filtration Methods—Sum/Difference Preferred Mode

FIG. 5 is a block diagram describing details of the frequency/phase calculation element 204. As depicted in FIG. 5, second order digital filters are used with a "sum/difference" method of isolating the bending mode vibration induced signals received from the left and right channel sensors on paths 254 and 256, respectively, from the superposed twisting mode vibration induced signals. The sum/difference method uses the known symmetries of the bending mode and twisting mode vibrations to separate the two vibration modes from the signals received on paths 254 and 256. The twisting mode vibrations of the flow tubes appear on the left and right channel sensors substantially out of phase while the bending mode vibration of the flow tubes appear substantially in phase on the two channels. Thus by summing corresponding sampled values from the left and right channels, the resultant signal is strengthened with respect to the bending mode vibrations while the components from the twisting mode vibrations are diminished. The summed signal values are said to have a strong component in the bending mode vibration components. Conversely, the difference between the output signals of the two channels (left channel signal minus right channel signal) has a strong twisting mode component and a diminished bending mode component. By so separating the two superposed sinusoids, an estimate of the frequency of each vibration mode can be easily derived for control of the various digital notch filters and digital band pass filters used to enhance the signals.

The left channel sensor signal values are received on path 254 in FIG. 5 and the right channel sensor values are received on path 256. The two values are summed by summing junction 504 and the resultant sum (also referred to herein as L+R) is applied to path 554. In addition, the difference between the two signal values is computed by summing junction 516 and the resultant difference (also referred to herein as L−R) is applied to path 570. The signal sum, L+R, is applied over path 554 to fast conjugate gradient (FCG) filter 512 which roughly estimates the frequency of the bending mode vibrations of the flow tubes. Though the estimate is crude, due to the lack of filtration of the input signal, the FCG filter 512 estimate converges rapidly in response to changes in the bending mode vibration frequency. The bending mode frequency estimate of FCG filter 512 is then applied to path 560.

The frequency estimates, as computed by the FCG and RML filters, are represented as a frequency coefficient "a" related to the frequency as in the form:

$$a = -2 \cos(\omega T_s)$$

where $\omega$ is the frequency and $T_S$ is the (decimated) sampling period. These values are in the form necessary to tune the second order notch and band pass filters used in the preferred embodiment of FIG. 5 and the embodiment of FIG. 6. The use of this form avoids the frequent need for computationally complex trigonometric conversions. The signal difference, L-R, is applied over path 570 to notch filter 518. The signal difference L-R has a strong frequency component in the twisting mode of the flow tubes and has a significantly diminished frequency component in the bending mode. Notch filter 518 is set to notch out the remnants of the bending mode vibration frequency from the L-R signal applied to its input. The center frequency of the notch is supplied as a parameter over path 560 from the estimated frequency generated by FCG filter 512. The isolated twisting mode vibration component of the flow tubes is applied as output from notch filter 518 to path 568.

The signal sum L+R on path 554 is also applied to the input of band pass filter 506. The signal sum L+R has a strong frequency component in the bending mode and a significantly diminished frequency twisting mode component. Band pass filter 506 passes a range of frequencies centered about the bending mode frequency estimated by FCG filter 512 and applied to band pass filter 506 as a parameter over path 560. The isolated bending mode component of the flow tubes is applied as output from the band pass filter 506 to path 556.

FCG filter 514 receives on path 568 the isolated twisting mode component generated by notch filter 518. FCG filter 514 estimates the twisting mode vibration frequency and applies the estimate to path 562 as its output. This estimate of the twisting mode frequency of the vibrating flow tubes is received via path 562 as the center frequency parameter for notch filter 508 and band pass filter 520. Notch filter 508 further enhances the bending mode component received via path 566 from band pass filter 506 by notching out remnants of the twisting mode component in the enhanced signal. Band pass filter 520 further enhances the twisting mode component received via path 568 from notch filter 518 by filtering out frequencies other than the narrow band centered about the estimate of the twisting mode of the flow tubes. In other words, the filter chain comprising band pass filter 506 and notch filter 508 enhances the bending mode vibration frequency component in the signal sum L+R while the filter chain comprising notch filter 518 and band pass filter 520 enhances the twisting mode frequency component in the signal difference L-R. All filters in these filter chains (506, 508, 518, and 520) are rapidly adapted to changes in the frequencies of the vibrating flow tubes by FCG filters 512 and 514.

The defining equation of all second order notch filters is preferably:

$$y(k) = u(k) + au(k-1) + u(k-2) - \alpha ay(k-1) - \alpha^2 y(k-2)$$

where u is the input sample, y is the enhanced output sample, $\alpha$ is the debiasing parameter, and a is the adapting coefficient. The defining equation of all second order band pass filters is preferably:

$$y(k) = (\alpha-1)au(k-1) + (\alpha^2-1)u(k-2) - \alpha ay(k-1) - \alpha^2 y(k-2)$$

The defining equation for the second order band pass filters may also be described in equivalent matrix form. The matrix form is useful in the description (below) of the FCG filter. For p unknown coefficients, X and A(k) below are p by 1 vectors. The matrix form of the second order band pass filters is therefore preferably:

$$y(k) = A'(k)X + (\alpha^2-1)u(k-2) - \alpha^2 y(k-2) \text{ where:}$$

$$X = [a], A(k) = [(\alpha-1)u(k-1) - \alpha y(k-1)]$$

The FCG algorithm adapts the coefficients of the band pass and notch filters to tune the filters to changes in the frequencies of the vibration modes. This algorithm is chosen because of its fast convergence property, numerical stability, and computational stability as compared to other known, existing algorithms. The FCG algorithm adapts the weights to minimize an error function of the filter to be adapted. The error function expressed in matrix form is preferably:

$$J(X_n) = \sum_{i=0}^{n} \lambda^{n-i}(y(i) - u(i))^2$$

where y(i) is calculated with the most recent coefficient $X_n$. The FCG algorithm may be computed by the following set of equations where the starting values are as follows:

$$X_0 = 0, Q_0 = A_0 A'_0, e_0 = y_0 - u_0, g_0 = A_0 e_0, \text{ and } d_0 = -g_0:$$

$$\rho_n = Q_n d_n$$

$$Y_n = \frac{g'_n g_n}{d_n \rho_n + \epsilon}$$

$$X_{n+1} = X_n + Y_n d_n$$

$$Q_{n+1} = \lambda Q_n + A_{n+1} A'_n$$

$$e_{n+1} = y_{n+1} - u_{n+1}$$

$$g_{n+1} = \lambda(g_n + Y_n \rho_n) + e_{n+1} A_{n+1}$$

$$\beta_n = \frac{g'_{n+1} g_{n+1}}{g'_n g_n + \epsilon}$$

if $\|g_{n+1}\|_2 > \|g_n\|_2$ then $d_{n+1} = -g_{n+1}$ else $d_{n+1} = -g_n + \beta_n d_n$ In the above FCG algorithm, for use in the second order FCG filter, all the parameters are scalars. For filters with p unknown coefficients, $Q_n$ is a p by p matrix and $d_n$, $g_n$ and $X_n$ are p by 1 vectors. The $\epsilon$ in the equations above is a small value added to avoid the numeric problems of dividing by zero in certain cases. So long as the value is small, the performance of the algorithm is not significantly degraded.

The FCG filter generates a frequency estimate on its output used to center the frequency of the notch and band pass filters referred to above. The frequency estimate is determined as:

$$f = \frac{\cos^{-1}(-a/2)}{(2\pi)}$$

The outputs of the twist and bend enhancement filter chains are then applied to corresponding RML filters 510 and 522 to compute more accurate estimates of the bending mode and twisting mode vibration frequencies of the flow tubes. In particular, the enhanced estimate of the bending mode vibration component generated as the output of notch filter 508 is applied to RML filter 510 for final frequency estimation. Similarly, the enhanced estimate of the twisting mode vibration component generated as the output of notch filter 520 is applied to RML filter 522 for final frequency estimation. The RML filters 510 and 522 provide superior frequency estimates of their respective input signals because their inputs have been enhanced by filters to eliminate unrelated and undesirable signal components. Problems associated with slower convergence of the RML filtration method are obviated by the enhancement of the signals supplied as their respective inputs.

The RML filters operate in accordance with the following equations specified in scalar notation where the starting values are $p(0)=0, \phi(0)=0, \bar{e}(0)=0, \bar{e}_F(0)=0, u_F(0)=0, a(0)=0$, and the first N values of a are initialized using the frequency estimates from the FCG filter then computing:

$$y(n) = u(n) + u(n-2) - \alpha^2 \bar{e}(n-2) - \phi(n)a(n-1)$$

$$\rho(n) = \left[ \rho(n-1) - \frac{\rho(n-1)x^2(n)\rho(n-1)}{\lambda + x(n)\rho(n-1)x(n)} \right] /\lambda$$

$$a(n) = a(n-1) + \rho(n)x(n)y(n)$$

$$\bar{e}(n) = u(n) + u(n-2) - \alpha^2 \bar{e}(n-2) - \phi(n)a(n)$$

$$\bar{e}_F(n) = \bar{e}(n) - \alpha^2 \bar{e}_F(n-2) - \alpha \bar{e}_F(n-1)a(n)$$

$$u_F(n) = u(n) - \alpha^2 u_F(n-2) - \alpha u_F(n-1)a(n)$$

$$\phi(n) = -u(n-1) + \alpha \bar{e}(n-1)$$

$$x(n) = -u_F(n+1) + \alpha \bar{e}_F(n-1)$$

The bending and twisting mode frequencies are then applied as output values from frequency/phase calculation element 204. Specifically, the twisting mode frequency of the flow tubes generated as output of RML filter 522 is applied to path 264 for further processing. In addition, the bending mode frequency of the flow tubes generated as output of RML filter 510 is applied to path 266 for further processing.

In addition to isolation of the bending versus twisting mode and the estimation of their respective frequencies, frequency/phase calculation element 204 enhances the bending mode signals for each channel to provide accurate sinusoidal signal input values to the phase calculations performed by Goertzel filter element 528. In particular, the twisting mode frequency estimate generated by RML filter 522 is applied over path 566 as the center frequency parameter to adapt notch filters 500 and 524. Similarly, the bending mode frequency estimate generated by RML 510 is applied over path 564 as the center frequency parameter to adapt band pass filters 502 and 526. The unenhanced signal from the left channel received over path 254 is applied to notch filter 500 to eliminate a notch of frequencies precisely centered about the twisting mode frequency estimate. The output of notch filter 500 is applied over path 550 to band pass filter 502 which passes a narrow band of frequencies precisely centered about the bending mode frequency estimate. The output of band pass filter 502 is applied to path 552 and represents an enhanced version of the bending mode signal generated by the left channel sensor. Similarly, for the right channel, the unenhanced right channel signal value is received on path 256, applied to notch filter 524 to remove the twisting mode frequencies, then applied over path 574 to band pass filter 526 to further enhance the signal by eliminating all but a narrow band of frequencies precisely centered about the bending mode frequency. The output of band pass filter 526 is applied to path 576 and represents an enhanced version of the bending mode vibrational signal generated by the right channel sensor.

The responses of the various filters depicted in FIG. 5 depend upon the specific parameter values chosen for the filters in accordance with the defining equations given above. Emperical studies have found the following values to be effective with typical flowmeter bend and twist frequencies.

| Element | Type | Parameters |
| --- | --- | --- |
| 500 | 2nd order notch filter | $\alpha = 0.99$ |
| 502 | 2nd order band pass filter | $\alpha = 0.99$ |
| 506 | 2nd order band pass filter | $\alpha = 0.95$ |
| 508 | 2nd order notch filter | $\alpha = 0.95$ |
| 510 | 2nd order RML adaptive filter | $\alpha = 0.99, \lambda = 0.99$ |
| 512 | 2nd order FCG adaptive filter | $\alpha = 0.01, \lambda = 0.99$ |
| 514 | 2nd order FCG adaptive filter | $\alpha = 0.01, \lambda = 0.99$ |
| 518 | 2nd order notch filter | $\alpha = 0.95$ |
| 520 | 2nd order band pass filter | $\alpha = 0.95$ |
| 522 | 2nd order RML adaptive filter | $\alpha = 0.99, \lambda = 0.99$ |
| 524 | 2nd order notch filter | $\alpha = 0.99$ |
| 526 | 2nd order band pass filter | $\alpha = 0.99$ |

The enhanced bending mode signals for both the left and right channel sensors are applied via paths 522 and 576, respectively, to the Goertzel filter phase calculation element 528. The Goertzel filter also receives the bending mode frequency estimate via path 564 from RML filter 510 and determines the average frequency over the previous half window period of samples. As noted above, the Goertzel filter applies weighting values to each enhanced sample and sums the weighted values through the number of samples required for one Hanning window. The Goertzel filter computations are performed in parallel for each of the left and right channel sensor signal values. The Goertzel filter calculations for each channel sensor value results in a complex number indicative of the phase of sinusoid represented by the channel's enhanced signal values. The resultant complex numbers indicative of phase for both the left and right channel sensor signals are applied to paths 260 and 262, respectively, as outputs of the Goertzel filter phase calculation element 528.

Figure 7:
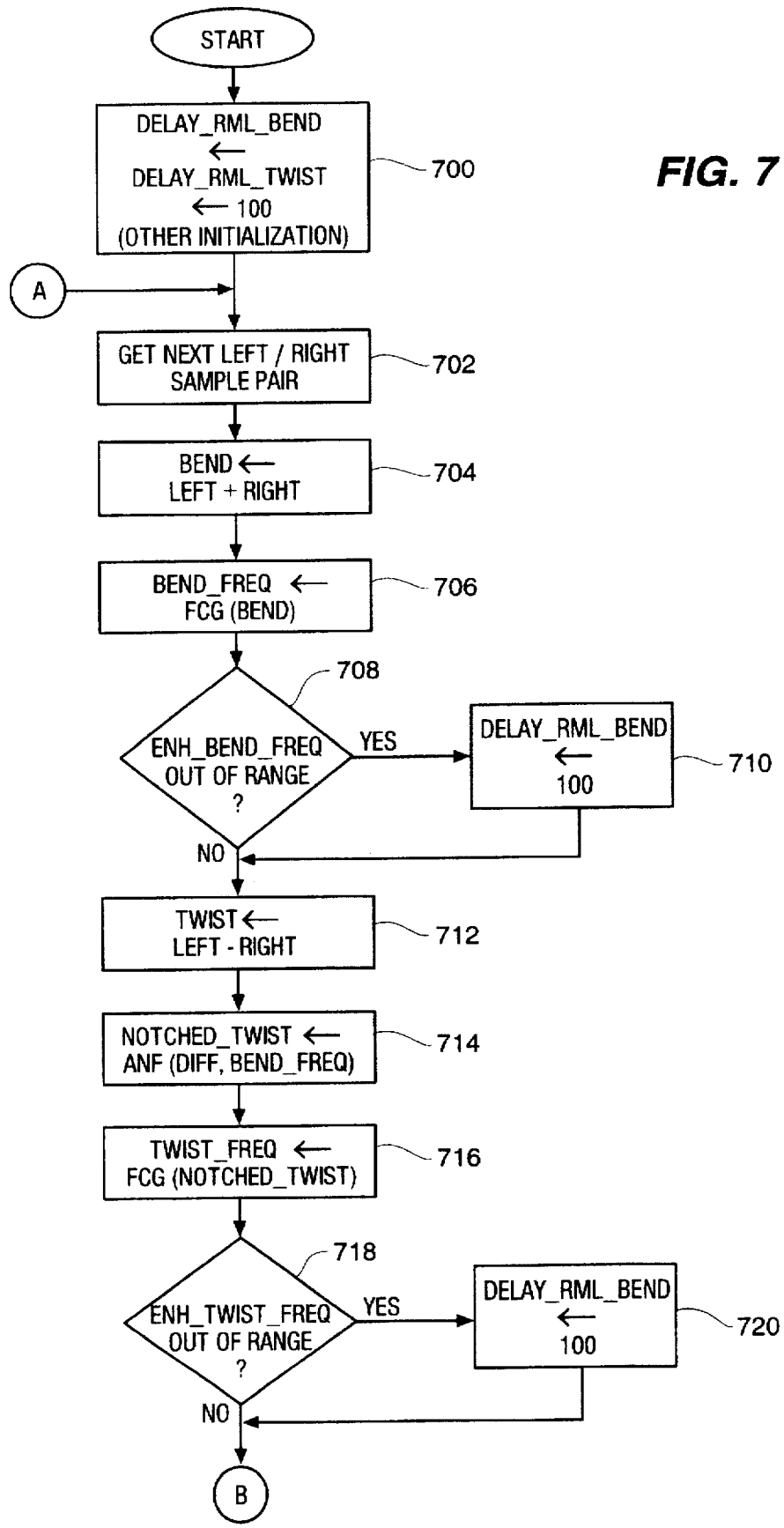
FIGS. 7–9 are flowcharts which describe the methods of an embodiment of the present invention operable within the DSP of the mass flow instrumentation of FIG. 1.
Figure 8:
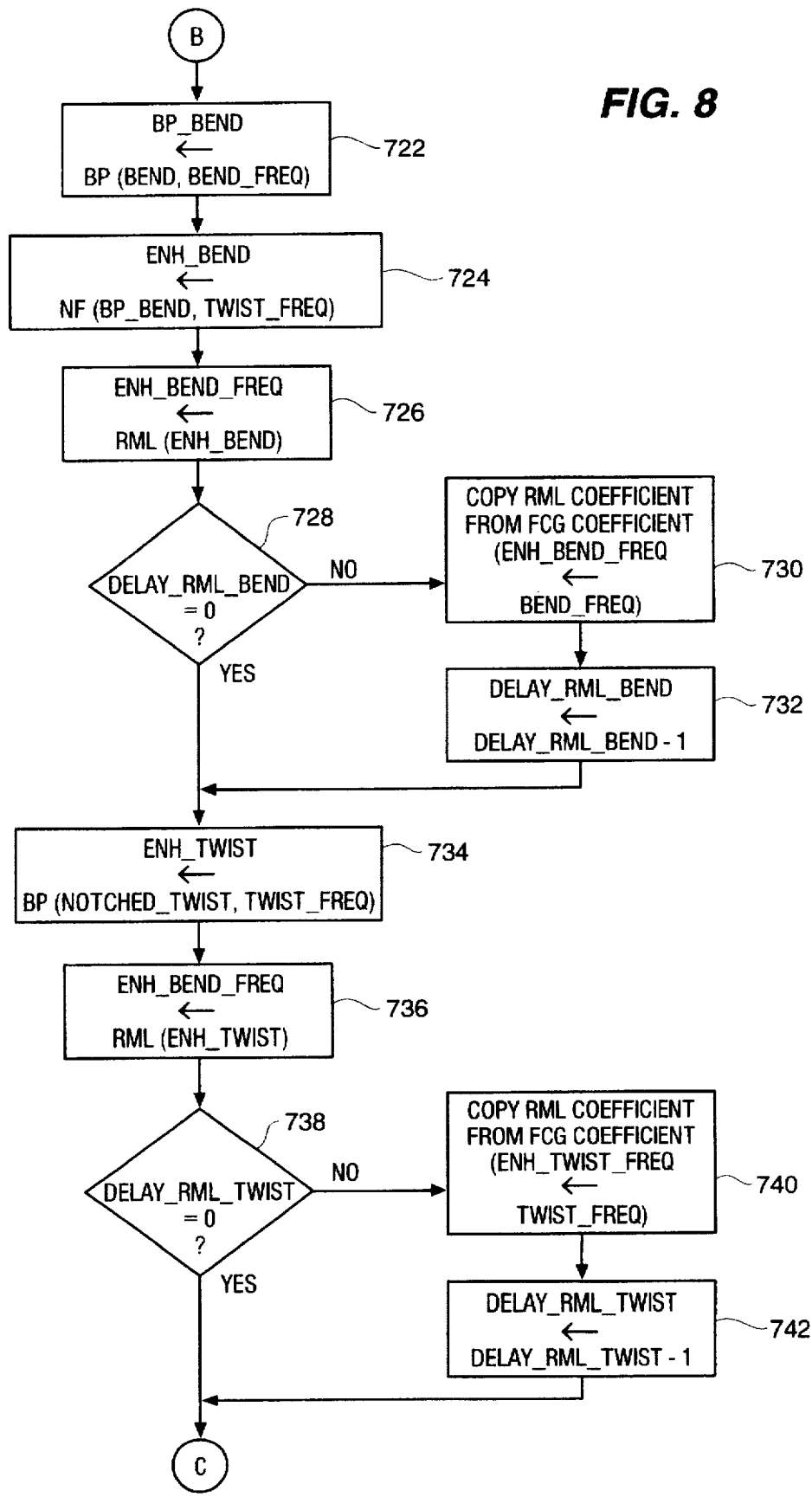
Figure 9:
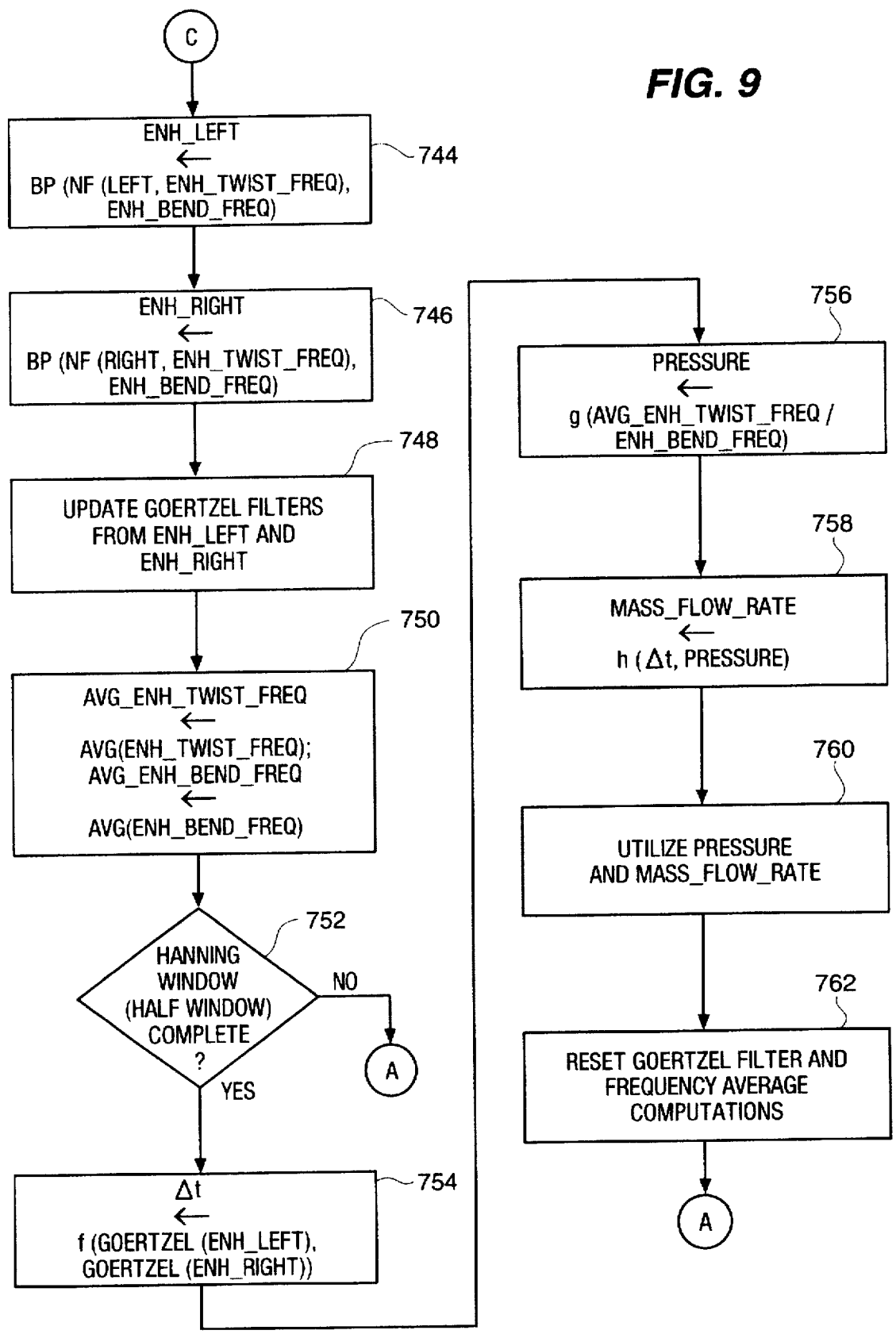

FIGS. 7-9 are flow-charts describing the operation of DSP 1200 in performing the sum/difference filtration methods. The methods shown in the flowcharts of FIGS. 7-9 present another view of the functionality described above with respect to the block diagram of FIG. 5. The flowcharts of FIGS. 7-9 describe the architecture of the software operable within DSP 1200. Elements 700-720 of FIG. 7 describe the operation of a first phase (first stage) of filtration within frequency/phase calculations element 204. In particular, this first stage provides estimates using FCG filtration methods of both the bending and twisting mode vibration frequencies. The FCG filtration method provides a rapid estimate of the frequencies given the sum/difference values computed from the left and right channel sensor output values. Elements 722-742 of FIG. 8 describe a second stage of the filtration processing within DSP 1200. The second stage enhances the bending and twisting frequency estimates provided by the first stage through use of notch filters, band pass filters, and RML filtration methods. Lastly, elements 744-754 of FIG.9 utilize the enhanced bending and twisting frequencies to provide enhancement filtration of the left and right channel sensor output values, to compute pressure within the Coriolis effect mass flowmeter, and to compute and correct a mass flow rate given the enhanced signal values for the left and right channels as well as the enhanced bending and twisting mode frequencies. Lastly, the third stage depicted in FIG. 9 utilizes the pressure value and the mass flow rate value so derived for control of the specific application process.

Element 700 initializes two variables used to modify RML filtration computations when the FCG filtration computations determine that the RML frequency estimates are outside a desirable range. It is known that RML filtration computation techniques converge poorly to changes in the input frequency when the estimated value falls outside an acceptable expected range. The variables are both initialized to a count of 100 samples to delay the RML filtration computations at the start of the filtration methods. Until 100 samples have been processed, the FCG filtration computation producing the estimated bending and twisting mode frequencies may not converge on a stabilized estimate sufficiently accurate to permit use of the RML filter for final enhancement of the frequency estimates. During this period of time, the frequency estimate of the corresponding FCG filter is used to initialize the RML filter. This feature of the present invention forces the starting point of the RML adaptation to be near the correct frequency thereby assuring rapid convergence of the RML adaptation. Element 702 is next operable to obtain the available left and right channel sampled signal pair. The sampled signals are applied to path 254 and 256 as shown in FIG. 2 by the decimation filters 202 of FIG. 2. As will be recognized by one of ordinary skill in the art, the sample signal pair, under the methods of the present invention, is retrieved from a FIFO or memory storage array in which the decimated sample values are stored.

Element 704 next computes the sum of the left and right channel sample values retrieved by element 702. As noted above, since the bending mode vibrations between the left and right channel signals are generally in phase and the twisting mode vibration frequencies are generally 180° out of phase, the sum of the left and right channel sample values substantially eliminates the twisting mode frequency component of the summed signals while enhancing the bending mode frequency component of the summed signals. The sum of the two channel signals therefore has a strong frequency component in the bending mode frequency and a significantly diminished frequency component in the twisting mode frequency.

Element 706 is next operable to estimate the bending frequency from the sum of the left and right channel signals through use of an FCG filtration method. Element 708 is next operable to determine if the FCG and RML filter frequency estimates are sufficiently close to one another. The FCG adaptive filter converges much more rapidly than the corresponding RML filter, especially when the frequency error is large. Thus, if the frequency estimates differ widely, it may be assumed that the FCG estimate is a better approximation of the current frequency than is the enhanced RML estimate. Under these conditions, convergence of the RML filter may be accelerated by forcing the RML filter to track (use) the FCG filter frequency estimate. The DELAY__RML__BEND variable is a counter value set to "suspend" the RML filter frequency estimates. While the RML filter estimates are so suspended, the RML filter frequency estimate computations remain close to the correct frequency due to use of the FCG filter estimated frequency in initializing the RML filter computations. When RML filter processing is allowed to resume (after the DELAY__RML__BEND counter decrements to zero) the estimated frequency computed by the RML filter will rapidly converge on a more accurate estimated frequency value. To determine whether the FCG and RML frequency estimates are sufficiently close, the following test is found to be useful:

$|1-(\pi+2\cos\omega_{FCG})/(\pi+2\cos\omega_{RML})| \leq 0.01$

It would be recognized by one of ordinary skill in the art that any value may be used to delay (suspend) the use of the RML filtration calculations. Empirically, it has been found that delaying for 100 samples provides sufficient time to assure stabilization of the FCG filtration computation estimates of the bending frequency before RML filtration uses the estimated bending frequency as discussed below. Additionally, one of ordinary skill will recognize that other inequality tests may be used to determine whether the RML filter output is close enough to the FCG filter estimate to be useful. Variations relating to specific applications or flowmeter designs will be recognized by those of ordinary skill in the art.

Element 712 is next operable to compute the difference between left and right channel signal values. Again, due to the phase relationships of the bending and twisting mode frequencies as noted above, the difference between the two sample signals will have a strengthened frequency component in the twisting mode frequency and a significantly diminished frequency component in the bending mode frequency. Element 714 is then operable to notch the difference signal value to eliminate any remnants of the bending mode frequency. In other words, element 714 somewhat enhances the signal value computed as the difference between the left and right channel signal values. Element 716 is next operable to estimate the twisting mode frequency value by use of an FCG filtration computation applied to the difference value as enhanced by the notch filter of element 714. Element 718 and 720 are operable in a manner analogous to element 708 and 710 discussed above. Specifically, element 718 determines whether the twisting mode frequency estimate produced by the FCG filtration computation of element 716 and the frequency estimate produced by the RML filtration computation are too widely separated for rapid convergence of the RML filter computations. If so, element 720 is next operable to reset the delay counter variable to impose further delay in the use of the RML filtration computations. In either case, processing continues on FIG. 8 with the second stage of filtration processing.

Element 722 of FIG. 8 applies a band pass filtration computation to the sum determined above by operation of element 704. A frequency band centered about the estimated bending frequency produced by operation of element 706 is passed by the operation of band pass filtration. Element 724 is next operable to further enhance the bending mode frequency by applying a notch filter to further eliminate remnants of the twisting mode frequency in the partially enhanced bending mode frequency estimate produced by operation of element 722. Element 726 is next operable to produce an enhanced estimate of the bend mode frequency using the RML filter technique. By using an enhanced version of the bend mode vibration signals as input, element 726 produces a more accurate estimate of the bend mode frequency than does element 706 discussed above.

Elements 728–732 are operable to determine whether the coefficient of computations applied in the RML filtration need to be reset in accordance with the value of the delay flag set by operation of element 710 or element 700. Specifically, element 728 is operable to determine if the delay counter value set by operation of elements 710 or 700 is non zero. If the delay counter value is non zero, elements 730 and 732 are next operable to reset the RML filtration computation coefficient to the estimated coefficient provided by the FCG filtration operation at element 706 above. Element 732 is operable to decrement the delay counter value to indicate that the RML coefficient used in the RML filtration computations has been delayed for one sample period.

Elements 734–742 are operable in a manner similar to element 722–732 above to enhance the twist mode component of the sensed signals. In particular, element 734 applies a band pass filter to the difference value computed by elements 712–714 above. The band pass filtration passes a narrow band of frequencies centered about the estimated twisting frequency computed by operation of element 716 above. Element 736 is next operable to produce an enhanced estimate of the twist mode vibration frequency using the well known RML filter technique. By using an enhanced version of the twist mode signal as input, element 736 produces a more accurate estimate than does element 716 discussed above.

Elements 738–742 are then operable to determine whether the RML filtration computation coefficient need be set in accordance with the delay counter value set by operation of element 720 or 700 above. In particular, if the delay counter value is non-zero, element 740 is operable to set the RML filtration computation coefficient to the estimated coefficient provided by the operation of FCG filtration computation performed by operation of element 716 above. Element 742 is then operable to decrement the delay counter value to indicate that the RML coefficient has been reset for one additional sample period. In either case processing then continues with the third stage of filtration operation depicted in FIG. 9.

The third stage of filtration represented by elements 744–762 of FIG. 9 utilize the enhanced twisting mode and bending mode vibration frequency values to enhance the bending mode vibration frequency component of the left and right channel signals. The various enhanced signal values are then utilized in the third stage of processing to determine the pressure within the operating Coriolis effect mass flowmeter and to determine the corrected mass flow rate as a function of the enhanced left and right channel sample values and the calculated pressure within the Coriolis effect mass flowmeter.

In particular, element 744 is first operable to notch the twist frequency signals out of the left channel signal values and then to pass the bend frequency signal band from the enhanced left channel signal value. The operation of element 744 corresponds to notch filter 500 and band pass filter 502 depicted in FIG. 5. Element 746 is similarly operable to enhance the bending mode frequency component of the right channel signal value. Operation of element 744 corresponds to the notch filter 524 and band pass filter 526 of FIG. 5.

Although it may appear that the combination of band pass filtration and notch filtration in filter chains such as elements 500 and 502 of FIG. 5 may be redundant in nature, one of ordinary skill in the art will readily recognize that simple second order band pass filters may be incapable of sufficiently rejecting noise and other signals outside the selected band. In particular, it is difficult to achieve efficient attenuation of the twist mode vibration frequency with a reasonable filter bandwidth. For these reasons, the best presently known mode of implementing the invention requires the combination of band pass filtration and notch filtration in filter chains to sufficiently enhance the desired signals.

Elements 748 and 750 update the computations of the Goertzel filter and the averaging of the estimated frequencies for each discrete (decimated and enhanced) sample. In particular, element 748 updates the ongoing Goertzel filter computation for the samples in the present Hanning (half) window by multiplying the enhanced left and right channel sample values by the appropriate Hanning window weighting value. This value is then incorporated into the ongoing DTFT computation for the present Hanning (half) window to produce the value indicative of phase used in subsequent computations. Element 750 updates the ongoing computation of an average frequency for each vibration mode of the vibrating flow tubes. To minimize the use of computationally complex inverse trigonometric functions, the actual bend and twist mode frequencies are computed only once every half window period even though the RML filters used to track the bend and twist mode frequencies produce estimates for every (decimated) sample. As noted above, the RML filters represent their respective frequency estimates in the form of filter coefficients that are related to the frequency by the formula:

$$a = -2 \cos(\omega T_s)$$

where $\omega$ is the frequency and $T_s$ is the decimated sample frequency. Estimates of the bend and twist mode vibration frequencies are computed every Hanning half window period by computing the average value of the frequency representative coefficient "a" over the previous half window period and supplying it to the formula:

$$\omega = \cos^{-1}(-a/2)/T_s$$

Element 750 therefore determines the average value for this frequency representative coefficient for both the bend and twist mode vibrational frequency estimates.

Element 752 is operable to determine whether this particular (decimated and enhanced) sample completes the processing of the samples in the present Hanning half window period. If not, processing continues by looping back to element 702 (at label "A") to await the next sample. Otherwise, processing continues with elements 754–762 to complete processing of the present Hanning half window period.

Element 754 computes the Δt value as a function ("f") of the values generated by the Goertzel filters over the past (just completed) Hanning window. As noted above, the Goertzel filters produce a complex number indicative of the phase of each of the sensor outputs for each of the left and right channels. As known in the art, the phase of the sample signal values may be used to determine the Δt value which is, in turn, proportional to the mass flow rate of the material flowing in the flow tubes of the Coriolis effect mass flowmeter.

Element 756 next determines the pressure within the flow tubes as a function ("g") of the enhanced, averaged, frequency estimates of the bend and twist mode vibrations of the flow tubes. As noted above, the ratio of the twist frequency to the bend frequency is proportional to the pressure within the flow tubes of an operating mass flowmeter.

Element 758 is then operable to compute a corrected mass flow rate, averaged over the past (just completed) Hanning window period, as a function ("h") of the Δt and pressure values computed above. As discussed in additional detail below, the corrected mass flow rate is computed as an iterative process based upon the uncorrected mass flow rate and several correction factors (principal among them is the pressure correction determined in accordance with the teachings of this invention).

Element 760 is then representative of any processing which utilizes the corrected mass flow rate or the pressure computations per se to determine or control the status of a process. This utilization may represent any useful application of the corrected mass flow rate or pressure per se derived from the methods of the present invention.

Finally, element 762 is operable to reset the calculations performed above by elements 748 and 750 which are operable over the period of a Hanning window. Specifically, the Goertzel filter weighted averaging and the average frequency computations are reset in preparation for the start of the next Hanning window period. Processing is then completed for this Hanning window, and the methods continue by looping back to element 702 (at label "A") to await availability of another decimated sample.

Frequency/Phase Filtration Methods—Fourth Order Filter Method

FIG. 6 depicts additional detail of an alternate embodiment of frequency/phase calculation element 204 which utilizes a fourth order FCG filter function to provide approximations of both the bending mode and twisting mode vibrational frequencies of the flow tubes. In addition to generating frequency estimates, the fourth order FCG filter provide some enhancement of the input signal. The fourth order FCG embodiment has an advantage over the sum/difference best known methods presented above in that the fourth order FCG filter is less sensitive to any imbalance between the left and right channel sensor output signals. However, the fourth order FCG filter is somewhat more complex computationally. Empirical test results have determined that in practical application of the sum/difference methods presented above, the potential imbalance of the left and right channel sensor signals does not affect the results of the frequency estimates and signal enhancement. The additional complexity of the fourth order FCG filter is therefore not required to improve measurement accuracy for pressure or mass flow rates.

The enhanced output of the fourth order FCG filter is applied to each of two filter chains to isolate and further enhance the bending mode and twisting mode vibrational frequencies of the flow tubes. Each filter chain comprises a notch filter which receives the modestly enhanced output signal of the fourth order FCG filter and whose output is applied to a chained band pass filter. The output of the band pass filter of each filter chain is applied to a second order RML filter to complete the enhancement of each isolated frequency signal. An additional pair of filter chains is associated with the left and right sensor channels to enhance the signals generated therefrom by the bending mode vibrations of the flow tubes. The enhanced signal for each of the left and right channel sensors is then applied to a Goertzel filter phase calculation element 528 as discussed above with respect to FIG. 5.

A fourth order FCG filter 600 receives the left channel signal values from path 254. The fourth order FCG 600 computes frequency estimates for the two strongest signals (highest amplitude sinusoids) in its input data. The lower of the two estimated frequencies is assumed to be the bending mode frequency and the higher of the two estimated frequencies is assumed to be the twisting mode frequency. The fourth order FCG 600 thereby provides an estimate of the frequency of the bending mode vibrations of the flow tubes and applies that estimate to path 652. The fourth order FCG filter 600 also thereby provides an estimate of the twisting mode frequency and applies that estimate to path 654. Lastly, the fourth order FCG filter 600 provides modest enhancement of the input signal from path 254 to eliminate noise signals outside the two strong components and applies the enhanced signal to path 650.

The defining equations of all second order notch and band pass filters and the RML filters is as noted above. The defining equation of the fourth order band pass filter in scalar form is preferably:

$$y(k) = (\alpha - 1)x(1)u(k-1) + (\alpha^2 - 1)x(2)u(k-2) + (\alpha^3 - 1)x(1)u(k-3) + (\alpha^4 - 1)u(k-4) - \alpha x(1)y(k-1) - \alpha^2 x(2)y(k-2) - \alpha^3 x(1)y(k-3) - \alpha^4 y(k-4)$$

where u is the input signal, y is the enhanced output signal, $\alpha$ is the debiasing parameter, and $x(1)$ and $x(2)$ are the adapting coefficients and $x(1)=a+b, x(2)=2+ab$. The defining equation may also be described in equivalent matrix form as:

$$y(k) = A'(k)X + (\alpha^4 - 1)u(k-4) - \alpha^4 y(k-4) \text{ where:}$$

$$X = \begin{bmatrix} a+b \\ 2+ab \end{bmatrix},$$

$$A(k) = \begin{bmatrix} (\alpha-1)u(k-1) - \alpha y(k-1) + (\alpha^3 - 1)u(k-3) - \alpha^3 y(k-3) \\ (\alpha^2 - 1)u(k-2) - \alpha^2 y(k-2) \end{bmatrix}$$

The fourth order FCG filter 600 generates two frequency estimates on its outputs used to center the frequency of the various notch and band pass filters referred to in FIG. 6. The frequency estimates are determined as:

$$f1 = \frac{\cos^{-1}(-a/2)}{(2\pi)}$$

$$f2 = \frac{\cos^{-1}(-b/2)}{(2\pi)}$$

Alternatively, the fourth order FCG filter 600 may receive its input from the right channel sensor values supplied on path 256. One of ordinary skill in the art will readily recognize the equivalence of the two input options with regard to operation of fourth order FCG filter 600.

A first filter chain further isolates and enhances the bending mode frequency component in the signal applied to input path 650. Notch filter 602 first notches out frequencies centered about the estimated twist mode frequency computed by element 612. The output of notch filter 602 is applied via path 656 to band pass filter 604 to pass a narrow frequency band centered about the estimated bend mode frequency computed by element 600. The output of band pass filter 604 is applied via path 658 to second order RML filter 606 to form the final estimate of the bending mode frequency. This final frequency estimate is then applied to path 266.

A second filter chain further isolates and enhances the twisting mode vibrational frequency component in the signal applied to input path 650. Notch filter 608 first notches out frequencies centered about the estimated bend mode vibration frequency computed by element 606. The output of notch filter 608 is applied via path 660 to band pass filter 610 to pass a narrow frequency band centered about the estimated twist mode frequency computed by element 600. The output of band pass filter 610 is applied via path 662 to second order RML filter 612 to form the final estimate of the twisting mode frequency. This final frequency estimate is then applied to path 264.

The bending mode frequency estimate generated by fourth order FCG filter 600 and applied to path 652 is received by band pass filter 604 to adapt the center frequency of the pass band of the filter. Similarly, the twisting mode frequency estimate generated by fourth order FCG filter 600 and applied to path 654 is received by band pass filter 610 to adapt the center frequency of the pass band of the filter. The precise bending mode frequency of the flow tubes generated by second order RML filter 606 and applied to path 266 is received by notch filter 608 to adapt the center frequency of the notch filter. Similarly, the precise twisting mode frequency of the flow tubes generated by second order RML filter 612 and applied to path 264 is received by notch filter 602 to adapt the center frequency of the notch filter.

A second pair of filter chains are used to isolate and enhance the bending mode frequency for each of the left and right channel sensor signals. Notch filter 614 receives the unenhanced left channel sensor signal values on path 254 and filters out frequencies within a notch centered at the precise twisting mode frequency supplied via path 264 from second order RML filter 612. The enhanced signal generated by notch filter 614 is applied over path 664 to band pass filter 616. Band pass filter 616 passes a narrow band of frequencies centered about the precise bending mode vibrational frequency supplied via path 266 from second order RML filter 606. The enhanced signal output by band pass filter 616 represents the bending mode signal of the left channel sensor signal values and is applied via path 666 to Goertzel filter element 528 in a manner similar to that discussed above with respect to FIG. 5.

A similar filter chain processes the right channel sensor signal values. Notch filter 618 receives the unenhanced right channel sensor signal values on path 256 and filters out frequencies within a notch centered at the precise twisting mode frequency supplied via path 264 from second order RML filter 612. The enhanced signal generated by notch filter 618 is applied over path 668 to band pass filter 620. Band pass filter 620 passes a narrow band of frequencies centered about the precise bending mode frequency supplied via path 266 from second order RML filter 606. The enhanced signal output by band pass filter 620 represents the bending mode signal of the right channel sensor signal values and is applied via path 670 to Goertzel filter element 528 in a manner similar to that discussed above with respect to FIG. 5.

The responses of the various filters depicted in FIG. 6 depend upon the specific parameter values chosen for the filters in accordance with the defining equations given above. Emperical studies have found the following values to be effective with typical flowmeter bend and twist frequencies.

| Element | Type | Parameters |
|---|---|---|
| 600 | 4th order FCG adaptive filter | $\alpha = 0.01, \lambda = 0.99$ |
| 602 | 2nd order notch filter | $\alpha = 0.8$ |
| 604 | 2nd order band pass filter | $\alpha = 0.5$ |
| 606 | 2nd order RML adaptive filter | $\alpha = 0.99, \lambda = 0.99$ |
| 608 | 2nd order notch filter | $\alpha = 0.8$ |
| 610 | 2nd order band pass filter | $\alpha = 0.5$ |
| 612 | 2nd order RML adaptive filter | $\alpha = 0.99, \lambda = 0.99$ |
| 614 | 2nd order notch filter | $\alpha = 0.99$ |
| 616 | 2nd order band pass filter | $\alpha = 0.99$ |
| 618 | 2nd order notch filter | $\alpha = 0.99$ |
| 620 | 2nd order band pass filter | $\alpha = 0.99$ |

It is important to note that the frequency estimates produced by RML filter elements 606 and 612 are used in a reciprocal feedback arrangement. In other words, the frequency estimate produced by RML filter element 606 is used to control notch filter 608 which filters the input of RML filter 612. Conversely, the frequency estimate produced by RML filter element 612 is used to control notch filter 602 which filters the input to RML filter 606.

Proper convergence of this cross coupled system is assured in two ways. First, band pass filters 604 and 610 are tuned using the output of the fourth order FCG filter 600. This provides strong attenuation of the unwanted component for each filter chain (i.e., removal of the twist mode frequency for the filter chain including RML filter 606 and removal of the bending mode frequency in the filter chain including RML filter 612). Notch filters 602 and 608 further attenuate the unwanted components. Second, if the RML frequency estimates differ significantly from the corresponding mode frequency estimates produced by the fourth order FCG filter 600, the respective RML filter (606 or 612) is initialized using the corresponding FCG filter estimate in a manner analogous to tha with respect to the sum/difference methods. This initialization is indicated by the dashed line extended to the RML filters (606 and 612) from the fourth order FCG filter 600.

Goertzel filter phase calculation element 528, as discussed above with respect to FIG. 5, receives the enhanced signals representing the bending mode vibrational motion of the left and right channel sensors and determines the phase of the sinusoid of each channel's signal. The phase of each channel, represented by a complex number determined by summing the sample values under control of Hanning window weights, are applied to paths 260 and 262 for further processing by $\Delta t$ calculation element 212 of FIG. 2.

Frequency Ratio Compensation

Methods of the present invention discussed above are applied to accurately determine the bending mode frequency and the twisting mode frequency of the vibrating flow tubes. The ratio of the twist mode to the bending mode may be used to determine pressure within the flow tubes as discussed above. However, as noted above, the frequency ratio is affected by other parameters of the flowmeter. These other factors may be used to compensate the frequency ratio by well known calibration techniques. The compensated frequency ratio may then be used to accurately determine the pressure within the flow tubes of the mass flowmeter.

The raw frequency ratio $FR_{RAW}$ is determined periodically as discussed above as the ratio of the twist mode frequency over the bend mode frequency of the vibrating flow tubes. $FR_{RAW}$ is corrected by applying compensation computations for physical mounting, temperature, density, and estimated mass flow rate (the mass flow rate as iteratively corrected through sampling periods) to determine $FR_{CORR}$ as follows:

$$FR_{CORR}=FR_{RAW}-\Delta FR_O-\Delta FR_T+\Delta FR_p+\Delta FR_m$$

$\Delta FR_O$ is a compensation value which accounts for changes in the frequency response of the flow tubes in response to physical mounting of the flowmeter. The physical mounting of the flowmeter in its intended application can alter the vibration response of the flow tubes as compared to the physical mounting used to calibrate the flowmeter at time of manufacture. $\Delta FR_O$ is determined by measuring the frequency ratio at installation or re-zeroing of the flowmeter ($FR_S$ mounted to the intended application conduit) and subtracting the frequency ratio measured at calibration ($FR_O$ mounted in a calibration fixture). The measured installation frequency ratio ($FR_S$) is also adjusted for differences in installation temperature as compared to calibration temperature. $\Delta FR_O$ is determined as follows:

$$\Delta FR_O=FR_S-(f_T(T_O)-f_T(T_S))-FR_O$$

where $f_T(T_O)$ is a polynomial in $T_O$ (calibration temperature of the flow tubes) appropriate to the particular flowmeter and $f_T(T_S)$ is a polynomial in $T_S$ (installation temperature of the flow tubes) appropriate to the particular flowmeter.

$\Delta FR_T$ is a compensation factor which accounts for changes in the frequency ratio of the flow tubes in response to changes in the flow tube temperature from calibration temperature. Specifically, $\Delta FR_T$ is determined as follows:

$$\Delta FR_T = f_T(T0) - f_T(Tm)$$

where $f_T(T_O)$ is a polynomial in $T_O$ (calibration temperature of the flow tubes) appropriate to the particular flowmeter and $f_T(T_m)$ is a polynomial in $T_m$ (presently measured temperature of the flow tubes) appropriate to the particular flowmeter.

$\Delta FR_\rho$ is a compensation factor which accounts for changes in the frequency ratio of the flow tubes in response to changes in the material density flowing within the flow tubes from calibration density. Specifically, $\Delta FR_\rho$ is determined as follows:

$$\Delta FR_\rho = F\rho(\rho_0) - F\rho(\rho_m)$$

where $F\rho(\rho_0)$ is a polynomial in $\rho_0$ (calibration density of material in the flow tubes) appropriate to the particular flowmeter and $F\rho(\rho_m)$ is a polynomial in $\rho_m$ (presently measured density of material in the flow tubes) appropriate to the particular flowmeter.

$\Delta FR_m$ is a compensation factor which accounts for changes in the frequency ratio of the flow tubes in response to changes in the mass flow rate through the flow tubes. Specifically, $\Delta FR_m$ is determined as follows:

$$\Delta FR_m = f_m(m)$$

where $f_m(m)$ is a polynomial in m (the mass flow rate as iteratively corrected through sampling periods) appropriate to the particular flowmeter. The mass flow rate compensation factor is iterative in the sense that the correction factor is generated, in part, as a correction from the previously corrected value of the past sampling period. This particular compensation factor therefore provides a feedback control on the correction of mass flow rate based upon previous correction computations.

Having thus computed and corrected the frequency ratio, the pressure associated therewith may be determined by standard computations based on the calibration curve established at manufacture associating pressure with frequency ratio. A polynomial function corresponding to a curve fit to the calibration data of frequency ratio as a function of pressure may be applied to $FR_{CORR}$. Alternatively, standard table lookup and interpolation techniques may be applied to a table representing the measured calibration data correlating frequency ratio to pressure.

Depending on the particular flowmeter and its application, some or all of the above described corrections of the raw frequency ratio $FR_{RAW}$ are not necessary to determine a pressure measurement of suitable accuracy. For example, if the frequencies of the vibrational modes of interest for a given flowmeter in a particular application are not affected by or subject to changes in mounting conditions, temperature, density, and mass flow rate, then $FR_{RAW}$ can be used directly to compute the pressure measurement as described above. If the frequencies of the vibrational modes of interest for a particular flowmeter are affected by only certain ones of mounting conditions, temperature, density or mass flow rate, then $FR_{RAW}$ need only be corrected for those factors having an effect.

It may occur that one of the vibrational modes utilized for a particular flowmeter may not be affected by Changes in pressure, mounting conditions, temperature, density and mass flow rate or that the effects due to changes in those parameters is negligible within the required pressure measurement accuracy. Under these conditions one can determine the pressure by measuring only a single frequency. An example is a flowmeter having a bending mode frequency that is unaffected, negligibly affected or not subject to changes in the above-mentioned factors including pressure. Pressure is determined by measuring the twist mode frequency and directly relating the twist mode frequency to the pressure. This is accomplished through the methods of the present invention as described above but with the assumption that one of the frequencies used in the frequency ratio, either the numerator or the denominator as appropriate, is a constant value. Where a flowmeter has a bending mode frequency, for example, that is affected by the above-mentioned factors but is affected to a relative degree substantially less than is the twist mode frequency for that flowmeter, one might accept lower pressure measurement performance and utilize only the twist mode frequency for their pressure measurement and pressure compensation.

It is apparent to those skilled in the art that the methods of the present invention are equally applicable to vibrating tube densitometers. The measurement tube of a vibrating tube densitometer is excited in two modes of vibration as described above. The two frequencies are measured and processed as described above to produce a signal indicative of the pressure within the vibrating tube. Since densitometers are not used to measure mass flow rate, pressure flow rate, the pressure measurement is used as a pressure indication and measured density compensation and is not used, as described above for compensating the mass flow rate signal.

It is expressly understood that the claimed invention is not to be limited to the description of the preferred embodiment but encompasses other modifications and alterations within the scope and spirit of the inventive concept. In particular, the methods and apparatus of the present invention may be applied to Coriolis effect mass flowmeters with a variety of tube shapes including so called "U" shaped tubes, straight tubes, and others. Many variables contribute to the calibration of the methods of the present invention to a particular flowmeter configuration. Therefore, the data shown on the various figures is only illustrative. Because of the many variables involved, it cannot be assumed that the numerical values shown will be readily reproduced by others.

What is claimed is:

1. A method for determining the pressure within a flowmeter having vibrating flow tube means comprising the steps of:

vibrating said flow tube means of said flowmeter in a first vibration mode;

determining a first resonant frequency of said flow tube means in response to said first vibration mode of said flow tube;

vibrating said flow tube means of said flowmeter in a second vibration mode;

determining a second resonant frequency of said flow tube means in response to said second vibration mode; and determining said pressure within said flowmeter by calculating the ratio between said first resonant frequency and said second resonant frequency.

2. The method of claim 1 wherein said pressure is determined independently of said density of said material.

3. The method of claim 1 wherein said pressure is determined at a zero mass flow rate of said material.

4. The method of claim 1 wherein said pressure is determined at mass flow rates of said material greater than zero.

5. The method of claim 1 wherein said pressure is determined independently of said density of said material.

6. The method of claim 1 wherein said pressure is determined at a zero mass flow rate of said material.

7. The method of claim 1 wherein said pressure is determined at mass flow rates of said material greater than zero.

8. The method of claim 1 wherein said flowmeter is a Coriolis mass flowmeter.

9. The method of claim 1 wherein said flowmeter is a vibrating tube densitometer.

10. The method of claim 1 wherein said first vibration mode vibrates said flow tube means in a bending mode and wherein said second vibration mode vibrate said flow tube means in a twisting mode.

11. The method of claim 1 further comprising the steps of:
   determining an uncorrected mass flow rate corresponding to material flowing through said flowmeter; and
   deriving a corrected mass flow rate for material flowing through said flowmeter in response to the determination of said uncorrected mass flow rate and said pressure determination.

12. The method of claim 1 wherein the step of determining said first resonant frequency includes the steps of:
   sensing a first signal generated by motion of a first sensor associated with the vibrating flow tube means of said flowmeter;
   sensing a second signal generated by motion of a second sensor associated with the vibrating flow tube means of said flowmeter; and
   filtering said first signal and said second signal to extract a signal component corresponding to said first resonant frequency.

13. The method of claim 12 wherein said first vibration mode vibrates said flow tubes in a bending mode.

14. The method of claim 13 wherein the step of filtering includes the steps of:
   adding said first signal to said second signal to produce an isolated signal having a strong frequency component in the bending mode frequency; and
   enhancing said isolated signal to eliminate undesired components in said isolated signal to produce an enhanced signal in the bending mode frequency.

15. The method of claim 13 further comprising the steps of:
   determining an uncorrected mass flow rate corresponding to material flowing through said flowmeter in response to said vibrations of said flow tube means in said bending mode; and
   deriving a corrected mass flow rate for material flowing through said flowmeter in response to the determination of said uncorrected mass flow rate and said pressure determination.

16. The method of claim 1 wherein the step of determining said second resonant frequency includes the steps of:
   sensing a first signal generated by motion of a first sensor attached to the vibrating flow tube means of said flowmeter;
   sensing a second signal generated by motion of a second sensor attached to the vibrating flow tube means of said flowmeter; and
   filtering said first signal and said second signal to extract a signal component corresponding to said second resonant frequency.

17. The method of claim 16 wherein said second vibration mode vibrates said flow tube means in a twisting mode.

18. The method of claim 17 wherein the step of filtering said first signal and said second signal includes the steps of:
   subtracting said second signal from said first signal to produce an isolated signal having a strong frequency component in the twisting mode frequency; and
   enhancing said isolated signal to eliminate undesired components in said isolated signal to produce an enhanced twisting mode frequency signal.

19. The method of claim 1 wherein said flow tube means is vibrated concurrently in both said first vibration mode and said second vibration mode.

20. The method of claim 1 wherein said flow tube means is vibrated sequentially, one mode at a time in said first vibration mode and said second vibration mode.

21. The method of claim 1 wherein said step of determining said pressure includes:
   determining a ratio between said first resonant frequency and said second resonant frequency;
   compensating said ratio for changes in said ratio caused by changes in a parameter of said flowmeter; and
   wherein said pressure is determined in response to said compensated ratio.

22. The method of claim 21 wherein said parameter is the mounting condition of said flowmeter and wherein said compensating step comprises:
   determining a first calibration ratio when said flowmeter is calibrated at a first mounting condition;
   determining a second calibration ratio when said flowmeter is installed in its intended application at a second mounting condition;
   generating a ratio compensation value in response to said determination of said first calibration ratio and said second calibration ratio;
   compensating said ratio with said ratio compensation value; and
   wherein said pressure is determined in response to said compensated ratio.

23. The method of claim 21 wherein said parameter is the temperature of said vibrating flow tube means and wherein said compensating step comprises:
   determining a first calibration ratio when said flowmeter is calibrated at a first temperature;
   determining a second calibration ratio when said flowmeter is calibrated at a second temperature;
   generating a ratio compensation value in response to said determination of said first calibration ratio and said second calibration ratio;
   measuring the temperature of said vibrating flow tube means;
   compensating said ratio with said ratio compensation value in response to said measured temperature; and
   wherein said pressure is determined in response to said compensated ratio.

24. The method of claim 21 wherein said parameter is the density of said material in said vibrating flow tube means and wherein said compensating step comprises:
   determining a first calibration ratio when said flowmeter is calibrated with said material having a first density;
   determining a second calibration ratio when said flowmeter is calibrated with said material having a second density;
   generating a ratio compensation value in response to said determination of said first calibration ratio and said second calibration ratio;
   measuring the density of said material in said vibrating flow tube means;
   compensating said ratio with said ratio compensation value in response to said measured density; and
   wherein said pressure is determined in response to said compensated ratio.

25. The method of claim 11 wherein said step of determining said ratio includes:

determining a first calibration ratio when said flowmeter is calibrated with said material having a first mass flow rate;

determining a second calibration ratio when said flowmeter is calibrated with said material having a second mass flow rate;

generating a ratio compensation value in response to said determination of said first calibration ratio and said second calibration ratio;

compensating said ratio with said ratio compensation value in response to said corrected mass flow rate; and wherein said pressure is determined in response to said compensated ratio.

26. An apparatus for determining pressure within a flowmeter having vibrating tube means comprising:

means for vibrating said flow tube means in a first vibration mode;

means for vibrating said flow tube means in a second vibration mode;

sensor means attached to said vibrating flow tube means operable to generate signals responsive to the motion of said flow tube means;

means responsive to said sensor means for determining a first frequency of said first vibration mode;

means responsive to said sensor means for determining a second frequency of said second vibration mode;

determining a ratio between said first frequency and said second frequency;

measuring the density of said material in said vibrating flow tube means;

compensating said ratio in response to said measured density; and determining said pressure in response to said compensated ratio.

27. A method for determining the pressure within a flowmeter having vibrating flow tube means comprising the steps of:

vibrating said flow tube means of said flowmeter in multiple vibration modes, a first vibration mode being sensitive to changes in said pressure within said flowmeter and a second vibration mode being substantially insensitive to changes in said pressure within said flowmeter;

determining a first resonant frequency of said flow tube means in response to said first vibration mode of said flow tube; and determining said pressure within said flowmeter in response to the determination of said first resonant frequency.

\* \* \* \* \*